(12) United States Patent
Hegranes et al.

(10) Patent No.: US 10,997,866 B2
(45) Date of Patent: May 4, 2021

(54) SYSTEMS AND METHODS FOR DYNAMIC AIRSPACE

(71) Applicant: Kittyhawk.io, Inc., San Francisco, CA (US)

(72) Inventors: Jonathan Hegranes, San Francisco, CA (US); Andrew Elefant, San Francisco, CA (US); Michael Curry, San Francisco, CA (US); Joshua Ziering, San Francisco, CA (US)

(73) Assignee: Kittyhawk.io, Inc., San Francisco, CA (US)

(*) Notice: Subject to any disclaimer, the term of this patent is extended or adjusted under 35 U.S.C. 154(b) by 269 days.

(21) Appl. No.: 16/282,189

(22) Filed: Feb. 21, 2019

(65) Prior Publication Data
US 2020/0250996 A1 Aug. 6, 2020

Related U.S. Application Data

(63) Continuation of application No. 16/264,378, filed on Jan. 31, 2019, now Pat. No. 10,354,536.

(51) Int. Cl.
*G08G 5/00* (2006.01)
*G01C 23/00* (2006.01)
*B64C 39/02* (2006.01)
*B64D 45/00* (2006.01)

(52) U.S. Cl.
CPC ......... *G08G 5/0039* (2013.01); *B64C 39/024* (2013.01); *B64D 45/00* (2013.01); *G01C 23/00* (2013.01); *G08G 5/006* (2013.01); *G08G 5/0013* (2013.01); *G08G 5/0026* (2013.01); *G08G 5/0043* (2013.01); *G08G 5/0069* (2013.01); *B64C 2201/146* (2013.01)

(58) Field of Classification Search
CPC .. G08G 5/0039; G08G 5/0013; G08G 5/0026; G08G 5/0043; G08G 5/006; G08G 5/0069; B64C 39/024; B64C 2201/146; B64D 45/00; G01C 23/00
See application file for complete search history.

(56) References Cited

U.S. PATENT DOCUMENTS

2017/0278409 A1* 9/2017 Johnson ............... G08G 5/0013

\* cited by examiner

*Primary Examiner* — Michael D Lang
(74) *Attorney, Agent, or Firm* — Ansari Katiraei LLP; Arman Katiraei; Sadiq Ansari

(57) ABSTRACT

Provided is an airspace controller for creating and managing dynamic airspace for different users. The airspace controller may produce different dynamic airspace for each user by continually updating static controlled airspace maps with user-specific flight information including user-planned flights, authorization status of the user's flights, waivers, controlled airspace restrictions, and real-time flight telemetry. The airspace controller may generate a static airspace map for all users with different airspace user interface ("UI") elements at different regions that correspond to different airspace restrictions in effect at those regions. The airspace controller may create dynamic airspace for each user by modifying the static airspace map to include flight UE elements over regions of the static airspace map where user-defined flights are to occur. The flight UE element may include shapes that correspond to flight areas defined for a flight plan, and one of several graphical representations to identify authorization status of the flight.

20 Claims, 12 Drawing Sheets

SYSTEMS AND METHODS FOR DYNAMIC AIRSPACE

CLAIM OF BENEFIT TO RELATED APPLICATIONS

This application is a continuation of U.S. non-provisional application Ser. No. 16/264,378, entitled "Systems and Methods for Dynamic Airspace", filed Jan. 31, 2019. The contents of application Ser. No. 16/264,378 are hereby incorporated by reference.

BACKGROUND INFORMATION

Rules and regulations for flying in controlled airspace may be defined by regulatory agencies such as the Federal Aviation Administration ("FAA"). Different rules and regulations may apply to different aircraft (e.g., piloted aircraft, unmanned aircraft, passenger carrying aircraft, air taxis, delivery aircraft, drones, and/or other aerial vehicles), and may therefore create different controlled airspace or different tiers or classes of controlled airspace. For instance, the controlled airspace for drone or unmanned aerial vehicle ("UAV") flight may include altitude or height restrictions, no-fly zones (e.g., around airports, military bases, national landmarks, critical infrastructure, stadiums, specific events, governmental buildings, over emergency or rescue operations, etc.), time-of-flight (e.g., day or night) restrictions, maximum distance restrictions between aircraft and a remote pilot (e.g., line of sight restriction), and/or other restrictions.

The rules and regulations may be presented in static controlled airspace maps. Controlled airspace maps may present the different airspace restrictions for different aircraft via a static image or other static representation. Consequently, the controlled airspace maps may be difficult to read, may make finding the relevant information difficult, and/or may be difficult to use during flight to ensure that the flight is compliant. Moreover, users may manually manage their flight information (e.g., user flight plans, user flight approvals, etc.) entirely separate from the controlled airspace maps, and may manually correlate the flight information to the controlled airspace maps during planning and/or flight.

Further complicating the user's ability to fly in controlled airspace is the requirement to obtain approval prior to flight. Different approvals may be needed for different controlled airspace, aircraft, restrictions, and/or other flight variables. For instance, some flights may require authorization (e.g., Low Altitude Authorization and Notification Capability authorization), other flights may require waivers, Certificates of Authorization ("COAs"), and/or other approvals from the FAA, other domestic regulatory agencies, and/or international or foreign regulatory agencies depending on the aircraft being flown, the controlled airspace where the flight takes place, and/or other flight variables.

Existing air traffic control infrastructure was not designed to accommodate flights of different aircraft (e.g., UAVs, air taxis, delivery aircraft, etc.) at scale. Thus, as flight becomes more accessible and involves more types of aircraft, managing controlled airspace and approving flight becomes more challenging, time consuming, and costly.

DETAILED DESCRIPTION OF PREFERRED EMBODIMENTS

Figure 1:
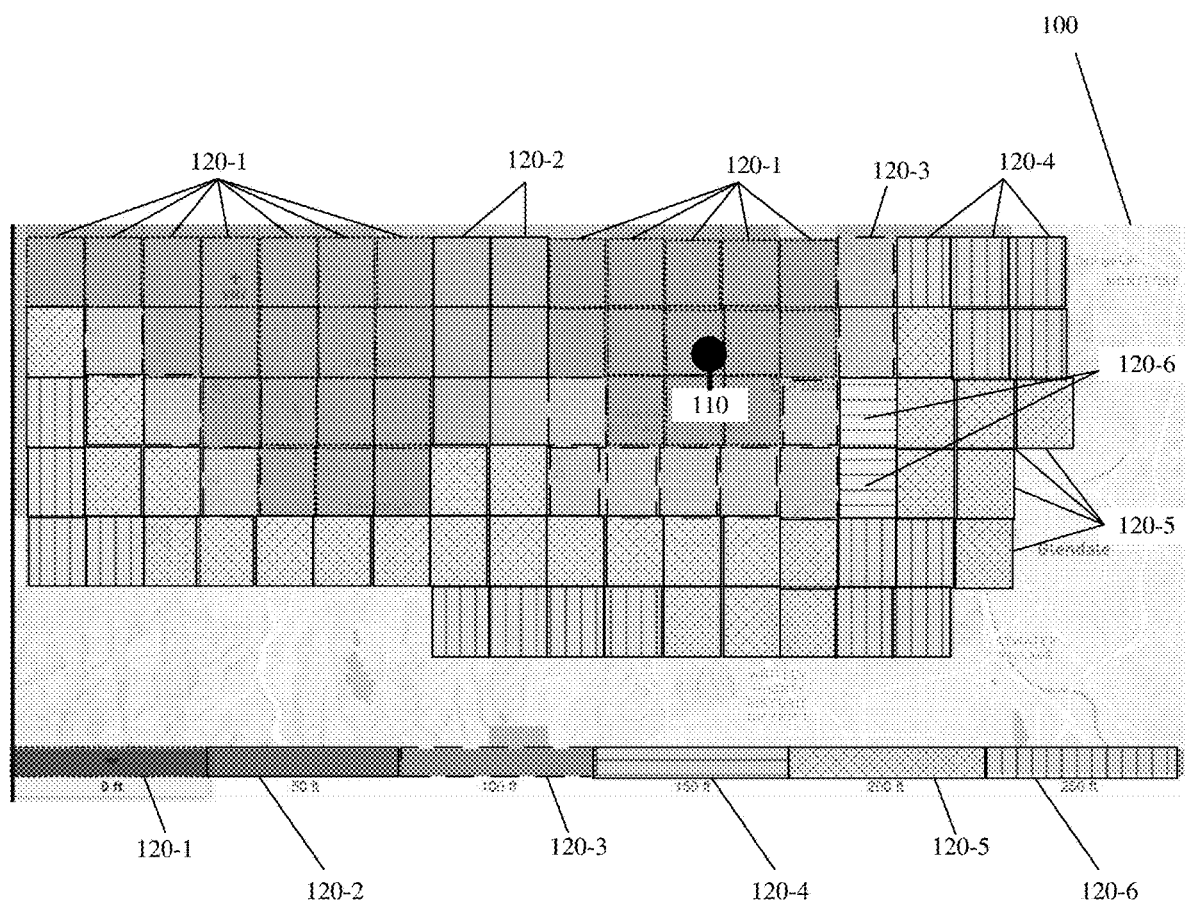
FIG. 1 illustrates an example of a dynamic airspace base layer in accordance with some embodiments presented herein.

The following detailed description refers to the accompanying drawings. The same reference numbers in different drawings may identify the same or similar elements.

Systems and methods, as described herein, provide an airspace controller for creating and managing dynamic airspace for different users. The airspace controller may create different dynamic airspace for each user based on user-pertinent airspace restrictions and/or user-specific flight information.

In some embodiments, the airspace controller may create and/or manage dynamic airspace by customizing controlled airspace for each user. For instance, the airspace controller may define dynamic airspace for a user to include airspace restrictions that are relevant for the user based on the user's aircraft and/or other user-specific flight information, while excluding other airspace restrictions that are irrelevant based on the user's aircraft and/or other user-specific flight information.

In some embodiments, the airspace controller may create and/or manage dynamic airspace for a user by incorporating user-specific flight information within or as part of the controlled airspace that is customized for that user. For instance, the airspace controller may define dynamic airspace for a user to include planned flights of the user, approval status of the user's flights, restrictions from controlled airspace that apply to the user's flights, real-time flight telemetry of one or more aircraft operated by the user, and/or other user-specific flight information.

In some embodiments, the airspace controller may create and/or manage the dynamic airspace by obtaining flight approvals based on the user-customized controlled airspace and user-specific flight information. For instance, the airspace controller may determine approvals (e.g., authorizations, waivers, exemptions, etc.) that a user-defined flight requires prior to flight. The airspace controller may automatically obtain the approvals from one or more regulatory agencies, receive approvals obtained and input by the user, and/or receive approvals submitted on behalf of the user by third-parties. The airspace controller may then update the dynamic airspace for the user by incorporating the approvals as part of the user-specific flight information and/or the controlled airspace that is customized for that user.

The airspace controller may provide programmatic access to the dynamic airspace of different users via an Application Programming Interface ("API"). Accordingly, different applications, devices, and/or computer code may have access to the dynamic airspace for one or more users, and may use the access to programmatically monitor or control flight, schedule future flights, report compliance, etc.

The airspace controller may also provide users direct access to their dynamic airspace via different layers of a graphical user interface ("GUI"). A base layer of the GUI may present the controlled airspace map that is customized for a particular user to include airspace restrictions that are pertinent to the user. The airspace controller may supplement and/or modify the base layer to present user-defined flights over the controlled airspace map with different graphical representations that identify the status of each user-defined flight. The GUI may be accessed from any user device (e.g., laptop computer, tablet, smartphone, etc.).

Users may interact with their dynamic airspace via the API or GUI. For instance, API calls and/or GUI interactions may be used to define a flight over a particular region. As the flight is defined, the airspace controller may determine controlled airspace restrictions that apply to the particular region, the selected aircraft, and/or other user-defined flight parameters. The airspace controller may obtain one or more authorizations, waivers, Certificate of Authorization ("COAs"), and/or other approvals based on the airspace restrictions, selected aircraft, and/or other user-defined flight parameters. Alternatively, the airspace controller may present the restrictions to the user in order for the user to modify the flight parameters for a compliant or automatically approved flight.

Users may also interact with their dynamic airspace in order to obtain additional information on user-defined flights. For instance, a user may directly interact with the GUI, and specifically, with each user-defined flight presented as part of the user's dynamic airspace in the GUI, to obtain user-specific flight information for the user-defined flights. The user-specific flight information may include flight approval status (e.g., authorization approved, authorization pending, authorization rejected, waiver obtained, waiver pending, etc.), aircraft for each flight, flight operators, flight times, flight areas, flight altitudes, and/or other flight parameters.

Accordingly, the airspace controller may programmatically and/or graphically provide each user with a unified and holistic view of their own custom airspace. The unified view simultaneously presents applicable controlled airspace restrictions with flights that the user has defined within the controlled airspace. In some embodiments, the airspace controller may populate the dynamic airspace of a particular user with flights defined by other users to facilitate shared access to popular airspace, and/or allow the particular user to plan around flights of other users.

FIG. 1 illustrates an example of the dynamic airspace base layer 100 in accordance with some embodiments presented herein. Base layer 100 may provide a graphical representation of the controlled airspace that is customized for a user. In particular, base layer 100 may provide a map of a region surrounding selected location 110. Location 110 may correspond to a current location of a user, a user selected location, a point-of interest, an address, landmark, or other position (e.g., coordinates). Base layer 100 may partition the airspace for the user-selected region into different tiles 120-1, 120-2, 120-3, 120-4, 120-5, and 120-6 (herein sometimes collectively referred to as "tiles 120" or individually as "tile 120").

Tiles 120 may have different graphical representations to connote different airspace restrictions for the different regions covered by each tile 120. The airspace controller may customize the airspace restrictions that are presented to a user. In some embodiments, the airspace controller may customize the airspace restrictions based on the aircraft flown by the user, flight plans, and/or other user-specific information. For instance, tiles 120 may represent a first set of controlled airspace restrictions when the user operates unmanned aerial vehicles ("UAVs"), and a different second set of controlled airspace restrictions when the user operates piloted aircraft.

In FIG. 1, each tile 120 may be a rectangle with a different solid line, broken line, and/or shading to represent a different altitude restriction for UAVs flying within the airspace represented by the corresponding rectangle. For instance, tile 120-1 may represent airspace where UAV flight at any altitude is prohibited, tile 120-2 may represent airspace where UAV flight up to 50 feet is permitted, tile 120-3 may represent airspace where UAV flight up to 100 feet is permitted, tile 120-4 may represent airspace where UAV flight up to 150 feet is permitted, tile 120-5 may represent airspace where UAV flight up to 200 feet is permitted, and tile 120-6 may represent airspace where UAV flight up to 250 feet is permitted. Additional or fewer tiles 120 may be used to represent airspace restrictions with different granularity (e.g., altitude restrictions in 100 feet increments) and/or other altitude restrictions (e.g., flight up to 300 feet, 400 feet, etc.). In some embodiments, tiles 120 may have different coloring and/or other visual differentiation to represent the different airspace restrictions. In some embodiments, tiles 120 may have graphical representations for connoting other flight restrictions in addition to, or instead of, altitude restrictions. For instance, tiles 120 may provide time-of-flight restrictions, aircraft size restrictions, etc.

Figure 2:
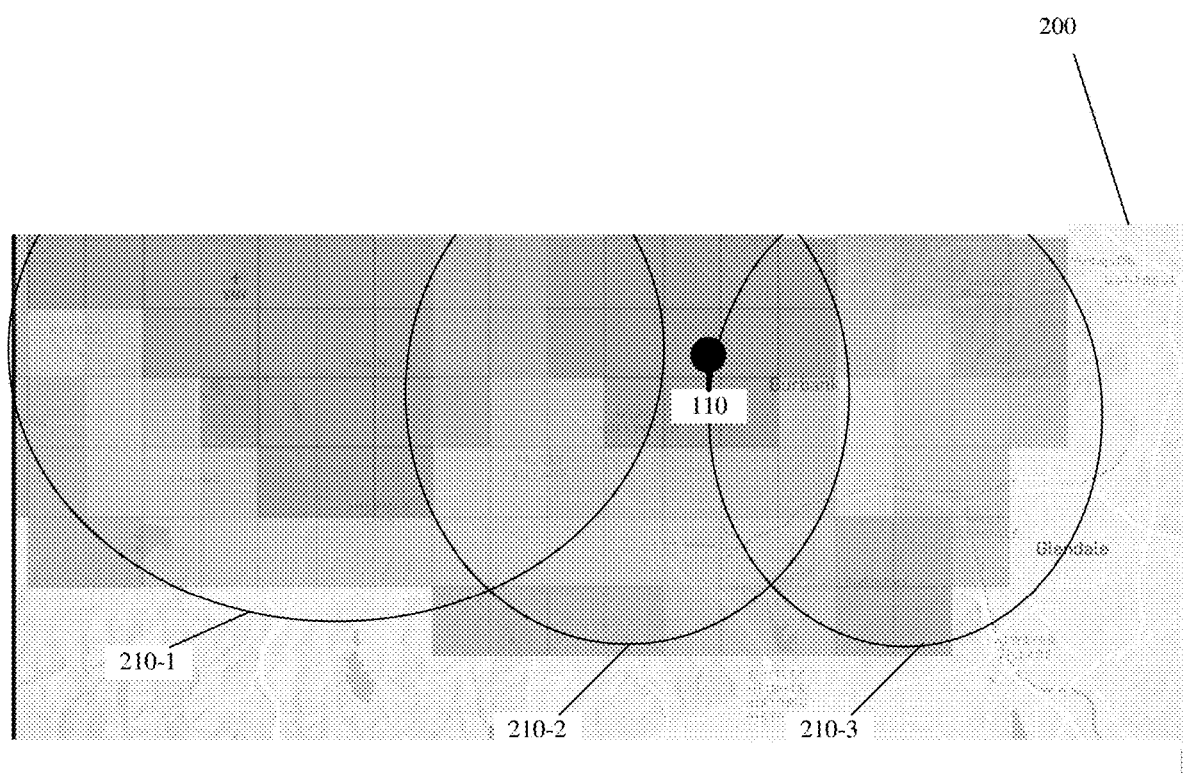
FIG. 2 illustrates an example of an alternate base layer for representing controlled airspace in accordance with some embodiments presented herein.

The airspace controller may generate other base layers in addition to, or instead of, base layer 100 in order to represent controlled airspace. FIG. 2 illustrates an example of alternate base layer 200 for representing controlled airspace in accordance with some embodiments presented herein.

In FIG. 2, controlled airspace falls within circular regions 210-1, 210-2, and 210-3 (herein sometimes collectively referred to as "regions 210" or individually as "region 210"). Different restrictions (e.g., altitude restrictions) may apply to the airspace within each region 210. Each region 210 may be centered about an airport, landmark, point-of-interest, and/or other position that is the basis for the airspace restrictions. Regions 210 may overlap. An overlapping region may include multiple restrictions. Users may move location 110 within layer 200 to obtain additional information about the airspace at or around location 110. Here again, the airspace controller may provide different restrictions for regions 210 or may adjust the size and/or placement of regions 210 for different users based on different airspace restrictions that are pertinent to each user.

In some embodiments, each tile 120 or region 210 may include metadata. The metadata may provide additional information about the airspace within tile 120 or region 210. The metadata may differ depending on the tiles 120 or regions 210 that are presented to different users based on different airspace restrictions that may apply or may be relevant to the different users.

Figure 3A:
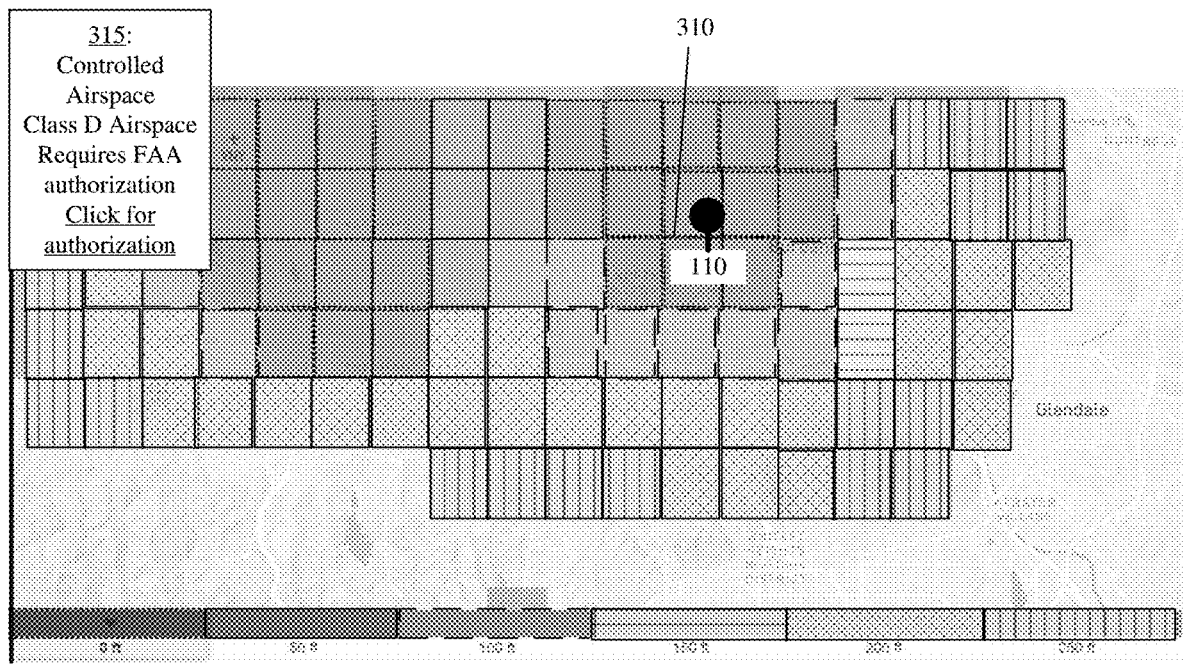
FIGS. 3A and 3B illustrate different metadata that is presented for different tiles in accordance with some embodiments presented herein.
Figure 3B:
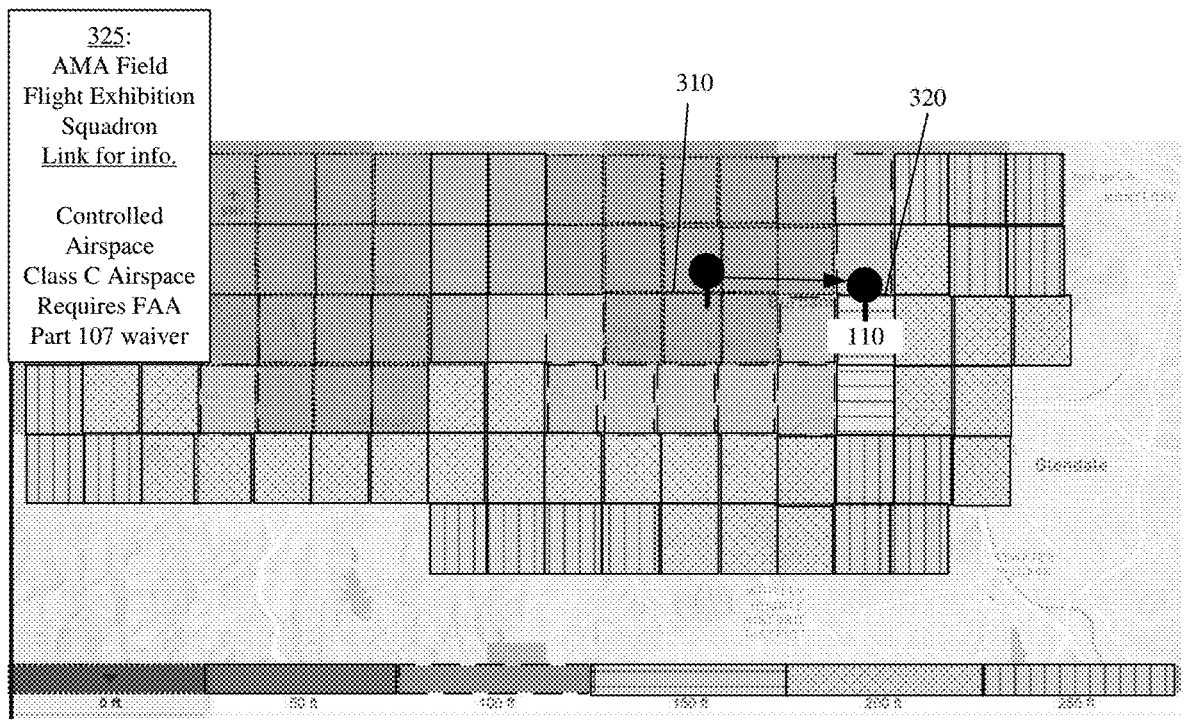

The airspace controller, via the GUI and layer 100 or 200, may present the metadata in response to moving location 110 within a corresponding tile 120 or region 210. The airspace controller may also provide the metadata in response to queries received via the API. FIGS. 3A and 3B illustrate different metadata that is presented for different tiles 120 in accordance with some embodiments presented herein.

FIG. 3A illustrates moving location 110 to a first position within first tile 310. Metadata 315 for first tile 310 may include classification (e.g., class A, B, C, D, etc.) for the airspace covered by first tile 310, requirements (e.g., authorizations and/or waivers that are needed) to fly in that airspace, other aircraft operating in that airspace, contact information (e.g., for nearby airports, air controllers, etc.), weather information (e.g., weather advisories), and/or other information affecting flight in that airspace.

FIG. 3B illustrates moving location 110 to a different second position within different second tile 320. In response to moving location 110 to be within second tile 320, the GUI presents different metadata 325 that is associated with the airspace covered by second tile 320.

The airspace controller may generate dynamic airspace by customizing the base layer (e.g., base layer 100 or base layer 200) for each user. As noted above, the airspace controller may customize the base layer for a user by determining controlled airspace restrictions that are relevant for that user and/or relevant metadata based on the aircraft being flown by the user, flight plans defined by the user, and/or other user-specific information. The airspace controller may generate a graphical representation of the base layer that is accessible via the GUI, and may define the base layer programmatically for access via API calls.

The airspace controller may supplement the dynamic airspace of each user to include user-specific flight information. The user-specific flight information may include planned flights of the user, approval status of the user's flights, restrictions from controlled airspace that apply to the user's flights, real-time flight telemetry for aircraft operated by the user, and/or other flight information.

In some embodiments, the airspace controller may link the user-specific flight information to an account of a user such that API queries submitted to the user account can be used to retrieve the user-specific flight information. In some embodiments, the airspace controller may present the user-specific flight information as one or more user-specific layers within the GUI. For instance, the airspace controller may overlay the user-specific layers over the base layer to further customize the graphical representation of the dynamic airspace for each user. In particular, the airspace controller may present the user-specific flight information at geographic locations that correspond to locations of the user-defined flights.

Figure 4:
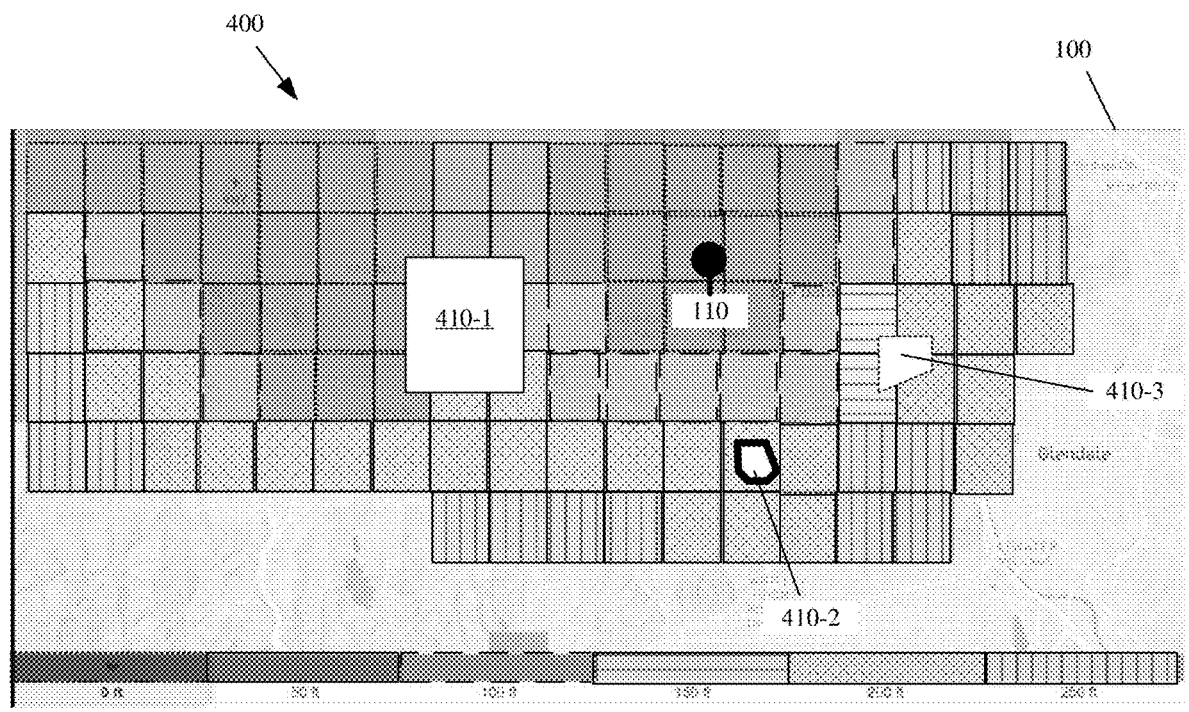
FIG. 4 illustrates an example of dynamic airspace that the airspace controller generates for a particular user in accordance with some embodiments presented herein.

FIG. 4 illustrates an example of dynamic airspace 400 that the airspace controller generates for a particular user in accordance with some embodiments presented herein. As shown, dynamic airspace 400 supplements airspace information of base layer 100 with flights 410-1, 410-2, and 410-3 (herein sometimes collectively referred to as "flights 410" or individually as "flight 410") defined by the particular user.

Each flight 410 may be graphically represented according to a defined flight plan for that flight 410. The flight plan may specify an area over which flight 410 is to occur. Accordingly, each flight 410 may by represented by a regular or irregular shape in the GUI.

In some embodiments, each flight 410 may represent an active and/or planned flight involving aircraft of the particular user. For instance, flight 410-1 may represent a UAV of the particular user that is in flight, flight 410-2 may represent a flight of the same UAV at some time in the future, and flight 410-3 may represent a future flight involving a piloted aircraft of the particular user at a later time in the future.

The particular user may define flights 410 in order to monitor certain activities or events that occur in the future. The particular user may define flights 410 for regularly scheduled drone operations. For instance, the particular user may wish to monitor progress at a construction site at the same time on different days, and each flight 410 may correspond to flight plans over different construction sites. The airspace controller may create flights 410 in response to user input provided via GUI interactions and/or API calls.

In some embodiments, flights 410 may be presented differently in the dynamic airspace of the particular user in order to convey different metadata or information about each flight 410. For instance, a first representation for flight 410-1 (e.g., a first user interface ("UI") element) may identify a flight that has been approved to fly in controlled airspace, a second representation for flight 410-2 (e.g., a second UI element) may identify a flight that is planned but pending approval, and a third representation for flight 410-3 (e.g., a third UI element) may identify a flight with a waiver that exempts the flight from certain standing rules.

In FIG. 4, the different representations may include different solid lines, broken lines, and/or line thicknesses. In some embodiments, the different representations may include different coloring and/or other visual differentiation of flights 410. Accordingly, from dynamic airspace 400 created by the airspace controller, the particular user can immediately determine all flight activity or flight activity in a region in conjunction with controlled airspace from a single view of a single interface. The same information may be accessed programmatically via API calls to the airspace controller.

Figure 5:
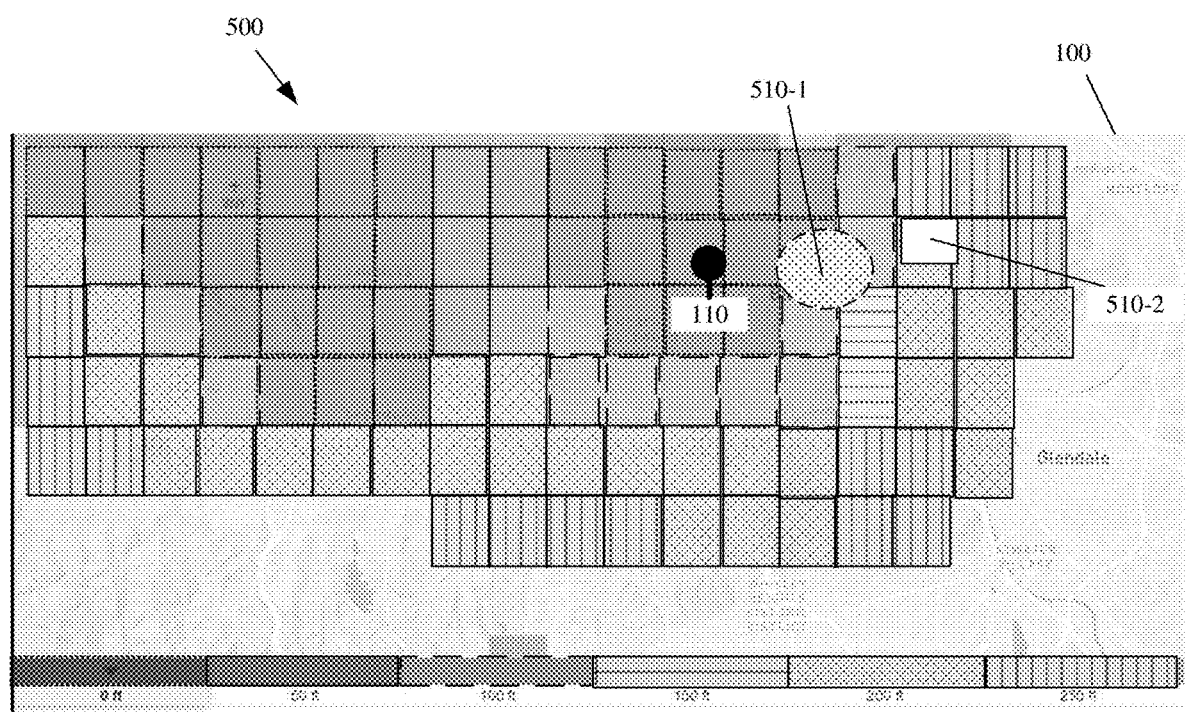
FIG. 5 illustrates an example of dynamic airspace that the airspace controller generates for a different second user in accordance with some embodiments.

FIG. 4 provides an example of the dynamic airspace that is provided to a first user. FIG. 5 illustrates an example of dynamic airspace 500 that the airspace controller generates for a different second user in accordance with some embodiments, wherein the second user is a different user than the particular user associated with FIG. 4. As shown in FIG. 5, the airspace controller may present the second user, operating in the same region as the first user, different dynamic airspace that is based on flights 510-1 and 510-2 defined by the second user. For instance, the dynamic airspace for the second user may present flights 510 with different shapes, that correspond to flight plans defined by the second user, at different areas of base layer 100 than flights 410 of the first user.

Figure 6:
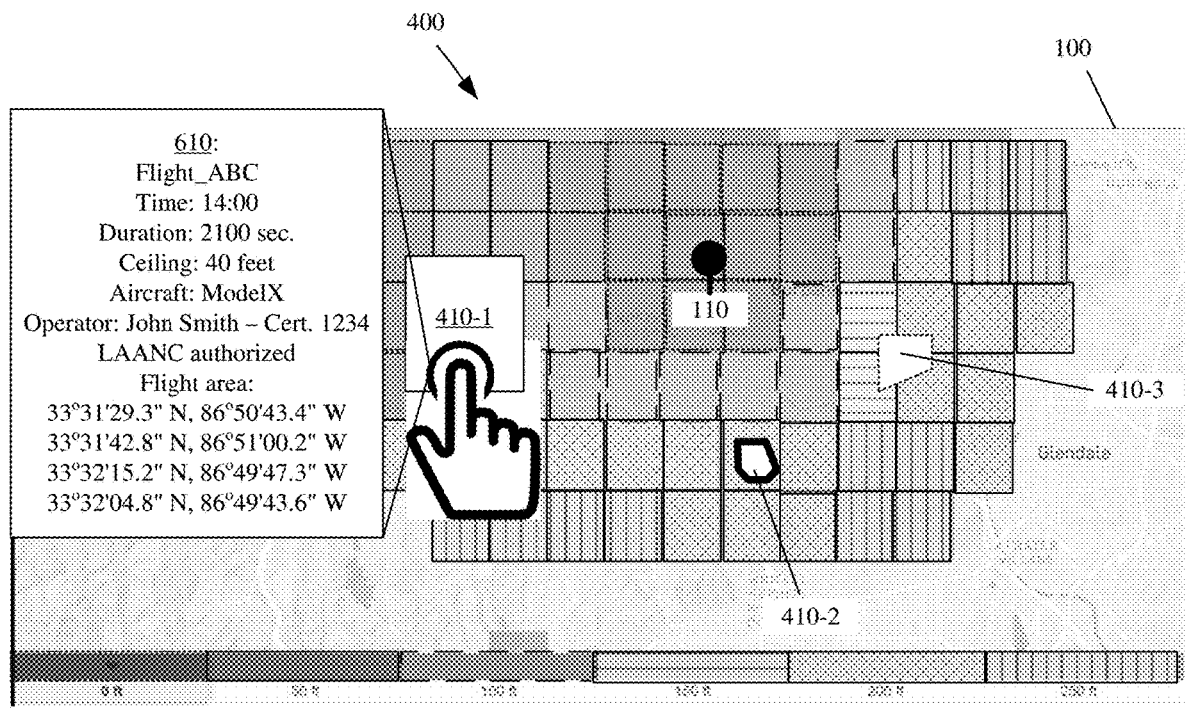
FIG. 6 illustrates an example of an informational layer that is presented in response to the first user selecting a flight from the user's dynamic airspace in accordance with some embodiments presented herein.

The first user may select any of flights 410 in dynamic airspace 400 and the second user may select any of flights 510 in dynamic airspace 500 in order to obtain additional information about a selected flight. FIG. 6 illustrates an example of layer 610 that is presented in response to the first user selecting flight 410-1 from dynamic airspace 410 in accordance with some embodiments presented herein. Layer 610 may present the planned flight time, duration, ceiling, aircraft, operator, obtained or pending authorizations and/or waivers, and/or other flight parameters for flight 410-1.

The airspace controller may alternatively provide information about flight 410-1 in response to an API call that selects flight 410-1 and/or that requests additional information about flight 410-1. For instance, the API call may include a first identifier identifying the user, and a second identifier identifying flight 410-1 defined by the user.

In some embodiments, the airspace controller may continually update the dynamic airspace that is created for each user based new or expired flights, and/or based on active flights of each user. For instance, the airspace controller may detect, via established wireless communications with different aircraft of a user, that one or more user aircraft are engaged in active flight. The airspace controller may determine one or more user-defined flights for each detected active flight, and may update the user-defined flights that are matched to active flights in the dynamic airspace of the user.

The airspace controller may update the user-defined flights by tracking the flight path (e.g., telemetry), speed, altitude, aircraft sensor data, environmental conditions, and/or other flight information. The tracked flight information may be accessed via API calls. The airspace controller may also update the user-defined flights by providing, in the GUI, a unique graphical representation for each active flight in the user's dynamic airspace.

Figure 7:
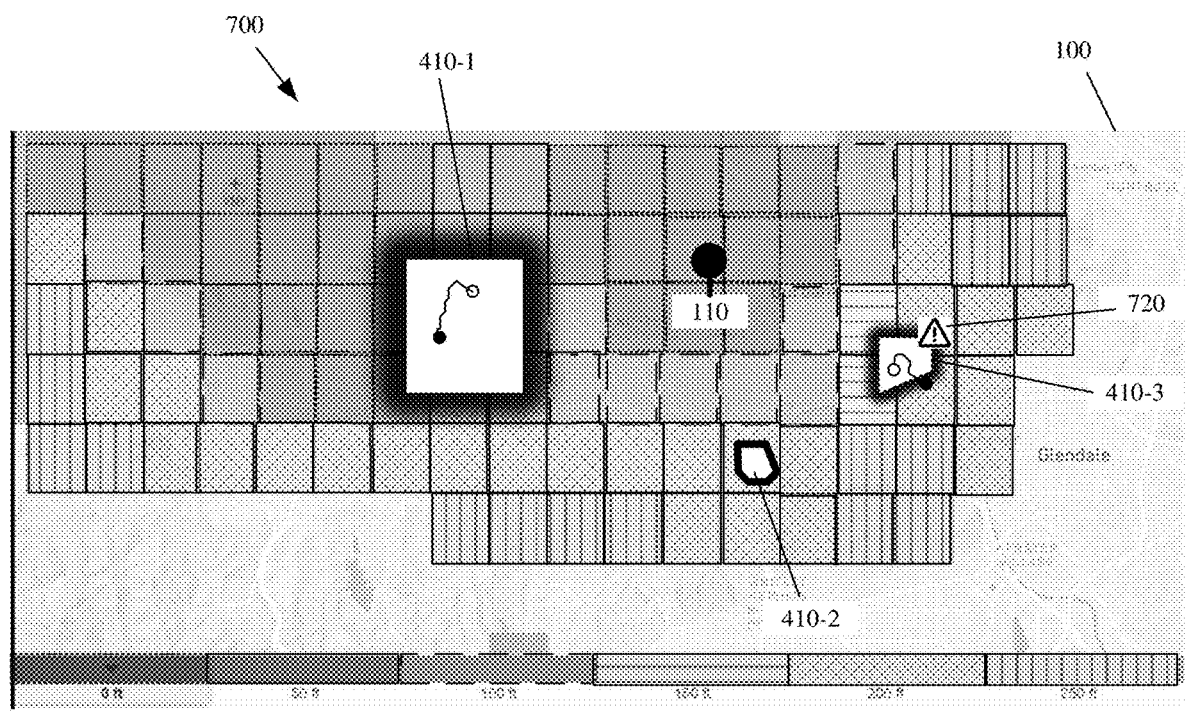
FIG. 7 illustrates an example of updated dynamic airspace in response to tracking two active flights in accordance with some embodiments.

FIG. 7 illustrates an example of updated dynamic airspace 700 in response to tracking two active flights 410-1 and 410-3 in accordance with some embodiments. As in dynamic airspace 400 of FIG. 4, dynamic airspace 700 of FIG. 7 illustrates three user-defined flights 410-1, 410-2, and 410-3. However, dynamic airspace 700 changes the graphical representation (e.g., UI elements) for flights 410-1 and 410-3 to identify the flights as being active. Moreover, dynamic airspace 700 may provide telemetry and/or track movements of the aircraft during each flight 410-1 and 410-3, and may provide an alert 720 to indicate that flight 410-3 has deviated from an approved flight plan.

The user may select either flight 410-1 or 410-3 in order to obtain additional real-time flight information. The real-time flight information may include current altitude, speed, battery level, fuel level, flap positioning, distance from pilot, and/or other data that the airspace controller may obtain directly or indirectly from the aircraft. Selecting active flight 410-1 may also present flight parameters that are approved for that flight so that the user can compare actual flight data against the approved flight parameters.

From dynamic airspace 700 being presented in a GUI or as data that is obtained via API calls to the airspace controller, the user can immediately determine if any active flights are operating outside of approved parameters, may determine the reasons for a flight operating outside of approved parameters, and may contact the flight operator to remedy the issue. The user may also passively monitor the flights to ensure that intended flight objectives are met.

In some embodiments, the airspace controller may update dynamic airspace 700 to further present weather and/or information regarding the area falling within or surrounding the flight area for a selected flight. The weather and/or other supplemental information may be obtained from the aircraft when the aircraft is equipped with environmental sensors. For instance, the environmental sensors may detect wind speed, wind direction, humidity, visibility, and/or other environmental conditions. In some embodiments, the airspace controller may obtain the supplemental information from supplemental sources including a weather bureau, news agency, and/or devices operated by various localities that may provide information about events, environmental conditions, and/or provide other flight relevant data.

Users may manage their dynamic airspace by modifying any defined flight or flight parameter via the GUI or API. Users may also manage their dynamic airspace by defining new flights via the GUI or API with the airspace controller accounting for airspace restrictions and/or resources associated with other planned flights that may affect the definition of a new flight plan. For instance, the airspace controller may determine flight parameters that violate applicable airspace restrictions. In some embodiments, the airspace controller may provide updated parameters that comply with the applicable airspace restrictions and/or that are subject to automatic approval. In some embodiments, the airspace controller may automatically clear a user-defined flight for flight in controlled airspace by obtaining approvals from one or more regulatory agencies when the user-defined flight complies with applicable airspace restrictions. In some other embodiments, the airspace controller may automatically clear a user-defined flight for flight in controlled airspace by obtaining approvals from one or more regulatory agencies for one or more flight parameters that violate applicable airspace restrictions. Users may also manually obtain and provide approvals to the airspace controller. The airspace controller may update the dynamic airspace of the user based on the approvals (e.g., approvals obtained by the airspace controller and/or provided by the user).

Different approvals may be obtained to permit flight in different controlled airspace, flight involving different aircraft, flight involving different pilots or aircraft operators, flight involving different flight parameters, etc. The different approvals may be provided by different regulatory agencies. For instance, approvals may be provided by the Federal Aviation Administration ("FAA"), air traffic controllers in airports adjacent to the controlled airspace, and/or other domestic or international regulatory agencies. The regulatory agencies may also include private or third-party agencies, private or third-party systems, and/or quasi-governmental entities that may have oversight over regions of controlled airspace. In some embodiments, the airspace controller may also obtain approvals independently of the regulatory agencies. For instance, the airspace controller may use advisory data and/or authorization data to approve user-defined flights that are in compliance with established controlled airspace rules and regulations. In other words, the airspace controller may provide approvals on behalf of a regulatory agency.

Approvals may be subject to flight parameters of a user-defined flight meeting different rules and/or regulations set in place by one or more regulatory agencies. For instance, commercial flights of small UAVs that weigh less than 55 pounds may be approved under the FAA small Unmanned Aircraft Systems ("UAS") rules (e.g., Rule 107), while an air taxi service for ferrying passengers in metropolitan areas may be approved under different sets of rules set by the FAA. Examples of different approvals that the airspace controller may obtain and/or use to update the dynamic airspace for UAV flights of a user may include Low Altitude Authorization and Notification Capability ("LAANC") authorizations, COAs, FAA issued waivers (e.g., Part 107 waivers), other waivers, other exemptions, other certificates, and/or other credentials.

Figure 8:
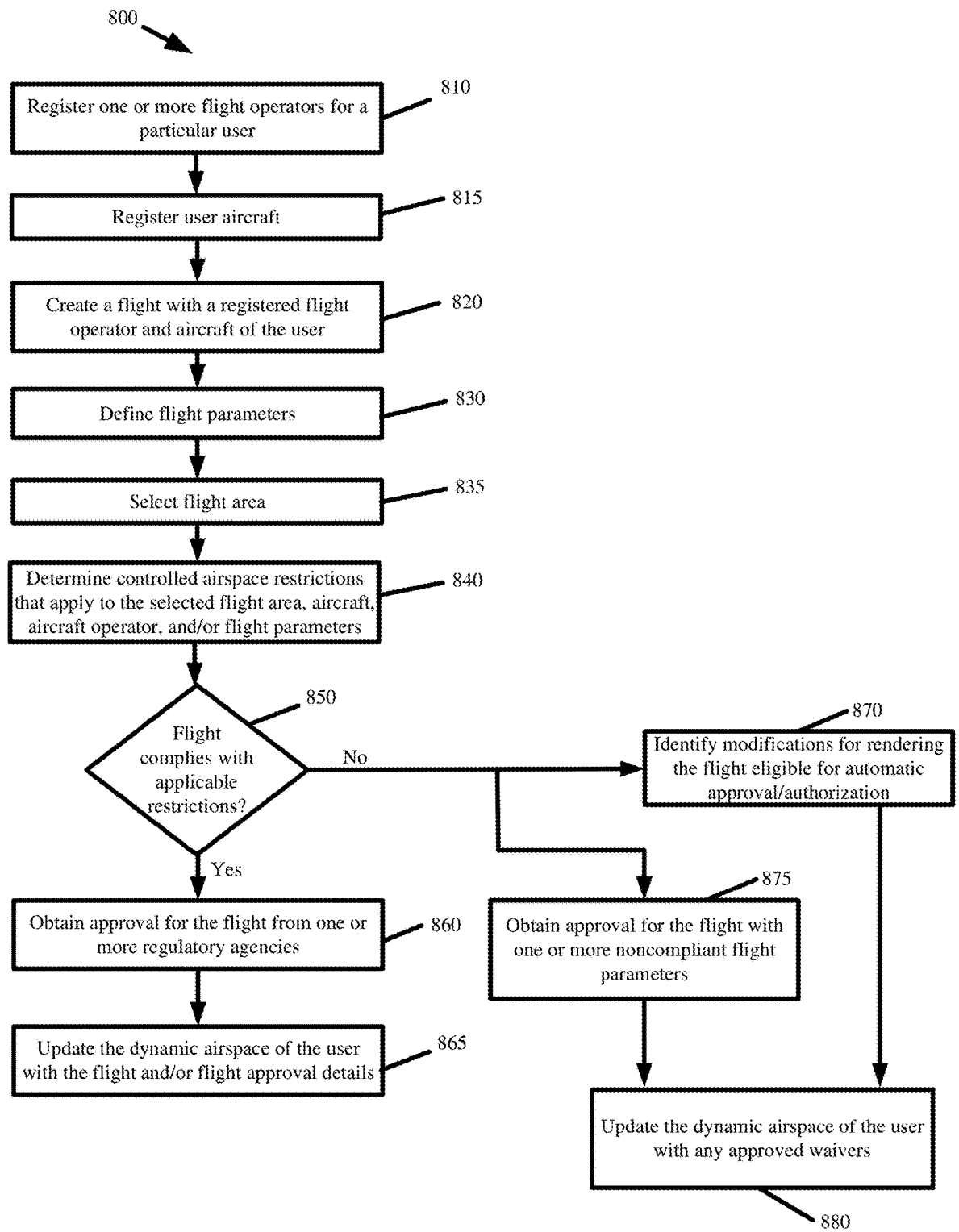
FIG. 8 presents a process for defining a flight as part of the dynamic airspace of a user in accordance with some embodiments presented herein.

FIG. 8 presents a process 800 for defining a flight as part of the dynamic airspace of a user in accordance with some embodiments presented herein. Process 800 may be performed by the airspace controller in response to user inputs provided via the airspace controller GUI or the airspace controller API.

Process 800 may include registering (at 810) one or more flight operators and/or pilots. Registering a flight operator may include validating the name of the operator, the operator's flight certificate and/or license, and/or other operator information (e.g., experience, background, training, medical history, etc.). For instance, a commercial drone pilot may be required to obtain a Remote Pilot Certificate from the FAA in order to fly a drone under the FAA's small UAS rules. The airspace controller may store information about each flight operator, that is registered by a user, to a corresponding user account. Accordingly, flight operators need only be registered once, and thereafter can be selected for different flights.

Process 800 may include registering (at 815) aircraft of the user to the user's account. Registering the aircraft may include providing the aircraft type (e.g., multi-rotor, fixed wing, single-rotor, fixed wing hybrid vertical take-off and landing, passenger aircraft, cargo aircraft, air taxi, etc.), a name and/or identifier for the aircraft, a make and model of the aircraft, a registration number, registration expiration date, a serial number, a size, a weight, airworthiness certificates, and/or other aircraft parameters. Users may register flight operators and/or aircraft by inputting the information via the GUI or one or more calls to the airspace controller API.

Process 800 may include creating (at 820) a flight by selecting one or more of a registered (at 810) flight operator and a registered (at 815) aircraft for the flight. Creating (at 820) the flight may further include defining (at 830) flight parameters and selecting (at 835) the flight area (e.g., area that may be flown over throughout the duration of the flight). For instance, the flight parameters may include a date and time of the flight, flight duration, maximum speed, maximum distance from the flight operator, and/or maximum flight height.

Figure 9:
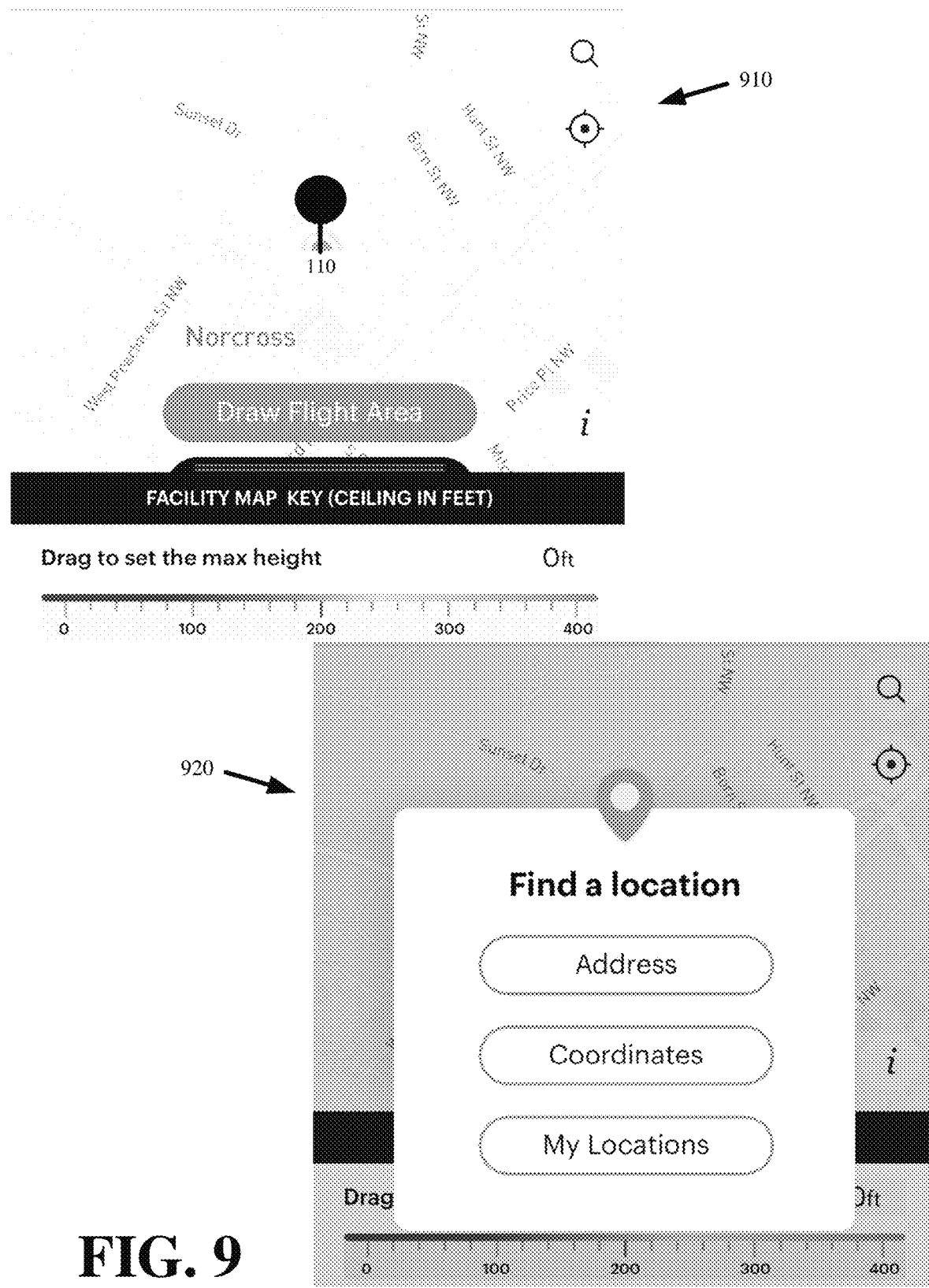
FIGS. 9 and 10 illustrate an example of selecting the flight area via the interactive layers provided by the airspace controller in accordance with some embodiments presented herein.
Figure 10:
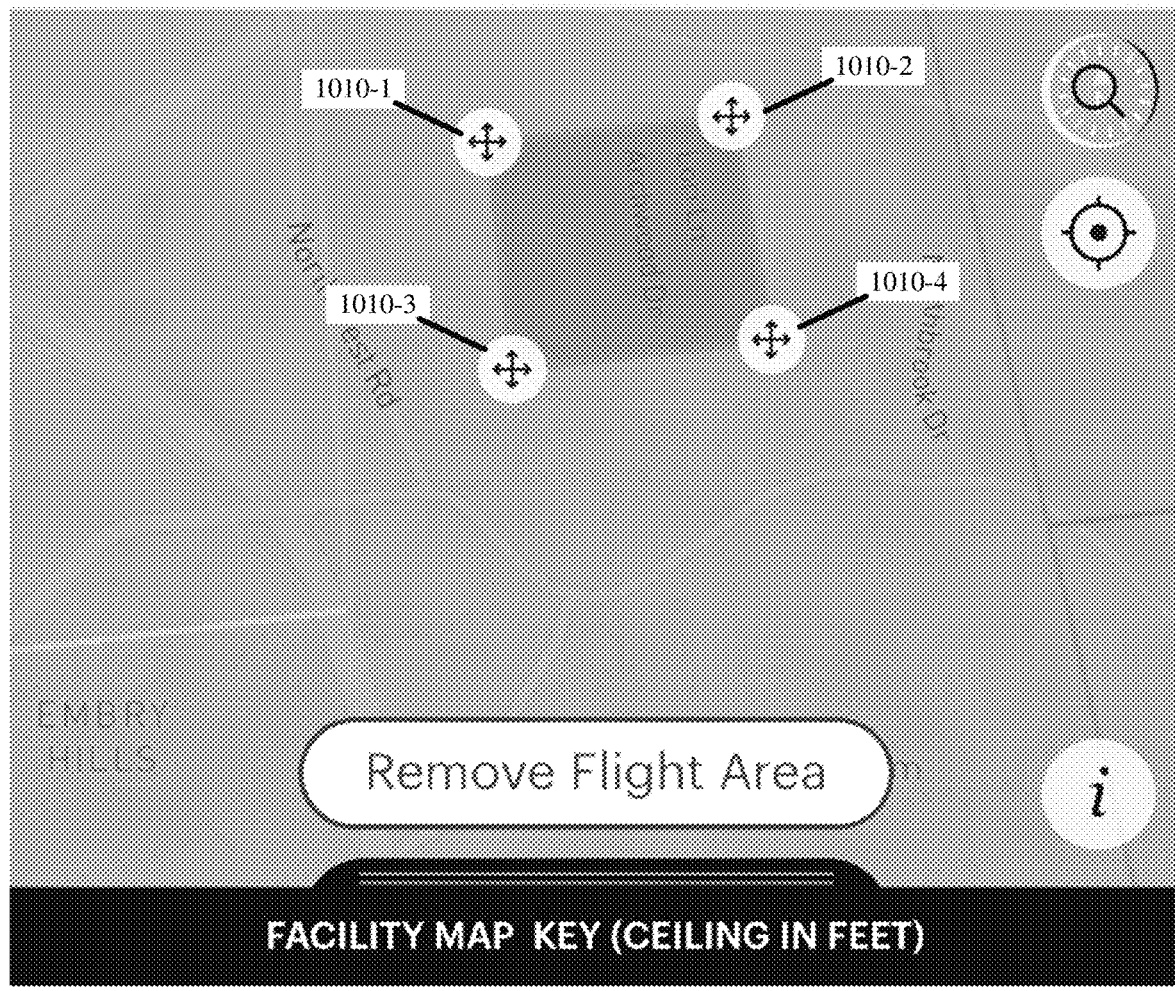
Figure 10:
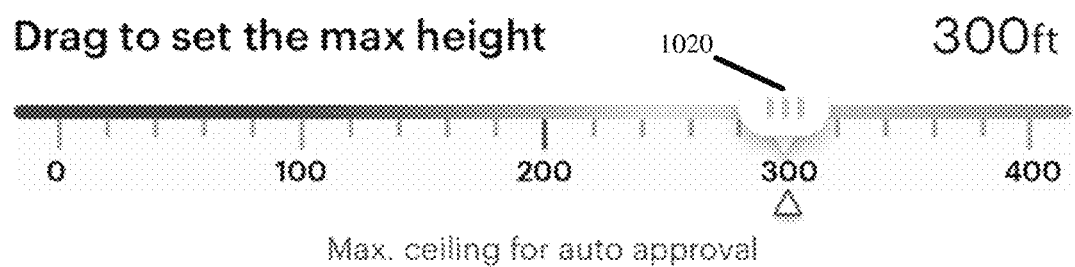

FIGS. 9 and 10 illustrate an example of selecting the flight area via the interactive layers provided by the airspace controller in accordance with some embodiments presented herein. As shown in FIG. 9, a user may create a flight by first specifying a flight origination location. The user may specify the flight origination location by moving (at 910) location 110 to the flight origination location, or by inputting (at 920) the flight origination location. For instance, the user may provide (at 920) an address, coordinates, landmark, point-of-interest, and/or other identifier for the flight origination location. The flight origination location may be at or near where the created flight will begin.

As shown in FIG. 10, the user may draw the flight area directly on the GUI by manipulating selectable elements 1010-1, 1010-2, 1010-3, and 1010-4 (herein sometimes collectively referred to as "selectable elements 1010" or individually as "selectable element 1010") for defining the flight area boundary. In particular, the airspace controller may provide an interactive layer with selectable elements 1010 surrounding the selected flight origination location. The interactive layer may also include inputs by which the user specifies one or more of the flight parameters. For instance, the interactive layer may provide input 1020 for specifying the maximum height for the flight.

In some embodiments, the user may define the flight parameters and/or the flight area by inputting the corresponding data via API calls made to the airspace controller. For instance, rather than visually draw the flight area using the GUI illustrated in FIG. 10, the user may simply provide the coordinates for the flight area boundary in one or more messages that are sent from a user device to the airspace controller via a data network. The airspace controller API may support a Representational State Transfer ("REST"), Simple Object Access Protocol ("SOAP"), and/or other architecture, and may support HyperText Transfer Protocol ("HTTP") messaging and/or messaging formats of other network protocols.

With reference back to FIG. 8, process 800 may include determining (at 840) the controlled airspace restrictions that apply to the selected flight area, aircraft, flight operator, and/or flight parameters. The airspace controller may obtain all restrictions for the controlled airspace falling within the selected flight area. The airspace controller may filter the restrictions to select a subset of restrictions that apply to the selected aircraft, flight operator, and/or flight parameters. For instance, the flight area may include a first set of restrictions for passenger aircraft flying over 20,000 feet, a second set of restrictions for air taxis flying with 1-4 passengers between 0-500 feet, a third set of restrictions for UAVs flying under 400 feet, and a fourth set of restrictions for UAVs carrying/delivery objects weighting under 20 pounds. Continuing with the example, the airspace controller may select the third set of restrictions based on the flight plan specifying UAV flight.

Process 800 may include determining (at 850) whether the user-defined flight parameters comply with the applicable controlled airspace restrictions. More specifically, the determination (at 850) may include verifying one or more of the registered operator and registered aircraft selected for the flight, the flight parameters, and the selected flight area based on controlled airspace restrictions defined for the selected flight area. For instance, when the user-defined flight is for a UAV, the airspace controller may verify that the selected flight operator is a certified UAS Part 107 pilot, may verify that the selected aircraft is compliant by virtue of satisfying size, weight, and/or restrictions, and/or may obtain consent that the flight operator will adhere to various UAV flight restrictions. The flight restrictions may be specified as part of the FAA's terms of LAANC authorization for Commercial Operations. The flight restrictions may include ensuring that the flight operator follows all UAS Part 107 rules and guidelines, maintains visual line of sight of the aircraft during flight, limits the aircraft speed to less than 100 miles per hour, does not fly during inclement weather, complies with any airspace restrictions and/or temporary flight restrictions, etc.

In response to determining (at 850—Yes) that the flight complies with the applicable restrictions, process 800 may include obtaining (at 860) approval for the flight from one or more regulatory agencies. In some embodiments, the airspace controller may automatically obtain (at 860) approval for the flight on behalf of the user. For instance, the airspace controller may send a flight authorization request to the FAA's LAANC system over a data network (e.g., the Internet). The flight authorization request may be checked against airspace data in the FAA UAS data exchange, such as the UAS facility maps. The airspace controller may then receive approval for the flight in response to the flight authorization request. In some other embodiments, the airspace controller may obtain (at 860) the approval indirectly from the user. In some such embodiments, the user may manually obtain approval for the flight, and may provide the approval (e.g., upload certificates, approval data, etc.) to the airspace controller. Process 800 may include updating (at 865) the user's dynamic airspace with the flight details and/or flight approval status. Thereafter, the flight and/or other flights defined by the user may appear in the user's dynamic airspace at a location of the map corresponding to the selected flight area for that flight. The user may access and/or modify the flight by selecting a graphical representation for the flight from the dynamic airspace, or by issuing API queries that identify the user account and the flight.

In response to determining (at 850—No) that the flight does not comply with one or more applicable controlled airspace restrictions, process 800 may including identifying (at 870) one or more modifications to make the flight compliant and therefore subject to approval. For instance, the airspace controller may determine that the flight is noncompliant because a portion of the flight exceeds the maximum flight ceiling allowed for that location, and the airspace controller may recommend reducing the maximum flight altitude for at least that location. Additionally, or alternatively, process 800 may including obtaining (at 875) approval for the flight with one or more noncompliant flight parameters that violate certain applicable controlled airspace restrictions. The airspace controller may determine the necessary approvals for the flight based on the applicable controlled airspace restrictions and the noncompliant flight parameters. For example, the airspace controller may determine that a waiver from the FAA is necessary for approval of a flight with a first noncompliant parameter, and that a COA from the Air Traffic Organization is necessary for approval of a flight with a different second noncompliant parameter. As a more specific example, the airspace controller may obtain (at 875) a first approval to authorize UAV flight at night, a second approval to authorize UAV flight beyond a visual line of sight, a third approval to authorize UAV flight over people, and/or a fourth approval to authorize UAV flight above 400 feet. Here again, the airspace controller may obtain different approvals from different regulatory agencies depending on the noncompliant flight parameters, the aircraft, the flight operator, and/or other flight parameters. The airspace controller may also obtain (at 875) the approvals as a result of the user independently applying for the approvals, and providing granted approvals (e.g., certificates and/or approval data) to the airspace controller. Process 800 may include updating (at 880) the dynamic airspace of the user based on the user-defined flights, obtained (at 875) approvals, and/or flight parameters that are not approved and remain noncompliant.

Some approvals (e.g., LAANC authorization) may be flight-specific (e.g., authorizing a single user-defined flight). In such cases, updating (at 865 or at 880) the dynamic airspace of a user may include updating the appearance of a particular flight in the user's dynamic airspace and/or incorporating information about the approval as part of the flight information. Accordingly, the airspace controller may enter and/or apply the flight-specific approvals to the flight information for the corresponding flights. For instance, a LAANC authorization may be associated with a particular user-defined UAV flight.

Other approvals (e.g., waivers) may be unrelated to any particular flight, and may instead provide the user, aircraft of the user, and/or flight operator of the user with an exemption to one or more standing rules or restrictions within specified controlled airspace and/or flight area. Such approvals may remain in effect for a certain duration (e.g., one year). In such cases, the airspace controller may update (at 865 or at 880) the dynamic airspace of the user by updating the presentation of the applicable airspace (e.g., in the GUI base layer or an overlay layer), rather than a specific user-defined flight. Accordingly, the airspace controller may enter and/or apply the user-specific approvals to the user account or the customized airspace of the user, rather than any specific flight defined within the user account.

In some embodiments, the airspace controller automatically accounts for approvals, that grant exemptions or waivers and that have been entered and/or applied to the user's account, during flight creation. For instance, if an approved waiver permits nighttime flight within a particular area, the user may be able to define a flight in that particular area during nighttime hours without the airspace controller raising one or more errors that would otherwise be presented if the approved waiver was not obtained.

In some embodiments, the airspace controller may manage the dynamic airspace of a user by monitoring user flights, and by providing in-flight alerts and/or reports based on tracked flight telemetry relative to flights defined in the dynamic airspace of the user. For instance, the airspace controller may detect when a user flight deviates or is about to deviate from approved airspace, and may alert the operator of the airspace restrictions and/or deviations. Alternatively, the airspace controller may produce flight reports from which the user may determine which flights and/or operators were in compliance, and which were out of compliance.

The airspace controller may monitor flights of a user by obtaining telemetry and/or flight information from the user aircraft. The telemetry and/or flight information may include data that is collected by one or more sensors of the aircraft. The data can include altitude, speed, location (e.g., Global Positioning System ("GPS") coordinates), trajectory, battery level, fuel level, images, live video stream, environmental measurements (e.g., temperature, wind speed, etc.), and/or other measurements obtained from sensors of the aircraft.

In some embodiments, the airspace controller may obtain real-time flight telemetry directly from the user's aircraft. The airspace controller may link and/or wirelessly connect directly to the user aircraft via a wireless network, and may communicate directly with the aircraft during flight. In some embodiments, the airspace controller may control and/or override user control of the aircraft using the direct connection or link between the airspace controller and the aircraft.

In some embodiments, the airspace controller links to different aircraft of a user via an application that is installed on user equipment ("UE") of the flight operators. Each UE may be within wireless range of particular aircraft during flight, and may be used to provide input to the aircraft (e.g., flight controls), receive output from the aircraft (e.g., telemetry information), and/or communicate with the aircraft during flight. The applications running on the different UEs may provide the collected data to the airspace controller via the same or different wireless network used to communicate with the aircraft. The airspace controller may aggregate the data from the different UEs or different user aircraft of a particular user, and/or may present the aggregated data within the dynamic airspace of that particular user.

The airspace controller may, additionally or alternatively, obtain real-time flight telemetry from sensors and/or systems that are not part of the aircraft being tracked. For instance, the airspace controller may collect flight data from a ground-based radar, an air traffic control system, satellite tracking systems, and/or other equipment on the ground, in the air, or in space that are separate from the aircraft being tracked.

The airspace controller may manage the dynamic airspace of a user by comparing the actual flight data (e.g., flight telemetry and/or flight information obtained from tracking the user's aircraft) from a user-defined flight against the flight parameters that were defined for that user-defined flight. The flight parameters may include restrictions and/or rules for the controlled airspace in which the flight occurs. As noted above, the airspace controller may generate alerts, in real-time, and/or reports, after a completed flight, to notify the user as to any noncompliant flights or flights that operated for some duration and/or some location outside of approved or authorized flight parameters.

In some embodiments, the airspace controller may also manage the dynamic airspace of a user by comparing the actual flight data to in-flight restrictions set by the user. The in-flight restrictions are restrictions set by the user rather than restrictions of controlled airspace set by a regulatory agency. The in-flight restrictions may include user-specified no-fly zones, user-specified maximum altitude limits, user-specified minimum altitude limits, maximum aircraft distance from the pilot, and/or restrictions that may be different than controlled airspace restrictions put in place by a regulatory agency. For instance, the user's aircraft may fly in airspace with a 100 foot maximum height, but the user may specify a 65 foot maximum height for the aircraft. The airspace controller may prevent the aircraft from exceeding the 65 foot maximum height during flight in that airspace based on the in-flight restriction set by the user. Alternatively, the airspace controller may generate one or more alerts when the aircraft exceeds the user-specified height limit during flight in that airspace, or may log violations of the user-specified height limit in a post-flight report after the flight is complete.

Figure 11:
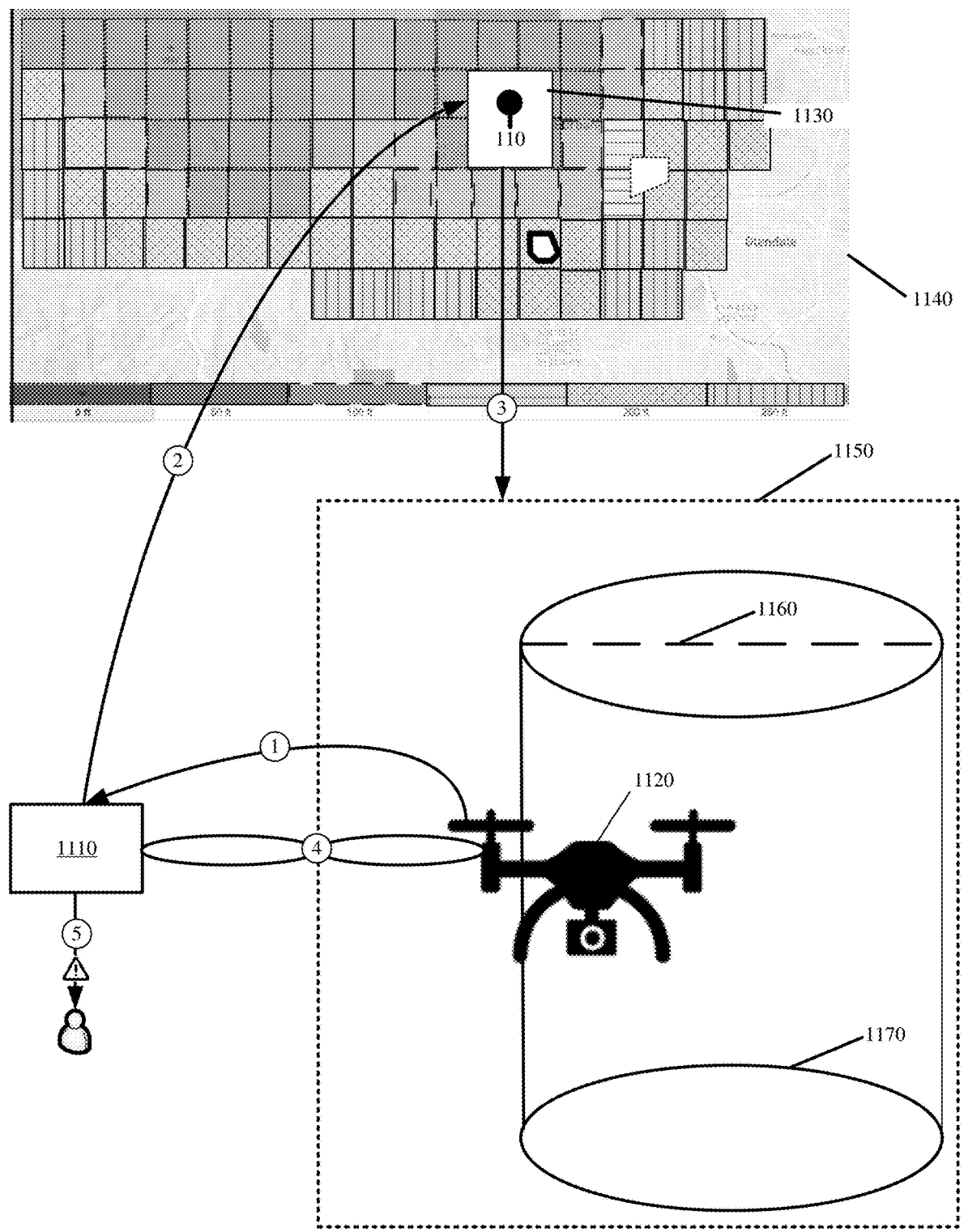
FIG. 11 illustrates an example of the airspace controller managing the dynamic airspace of a user in accordance with some embodiments presented herein.

FIG. 11 illustrates an example of airspace controller 1110 managing the dynamic airspace of a user in accordance with some embodiments presented herein. Airspace controller 1110 may connect to aircraft 1120 and/or other systems tracking aircraft 1120, and may obtain (at 1) coordinates that provide the location of aircraft 1120. From the detected location, airspace controller 1110 may determine (at 2) that the location of aircraft 1120, flight time, selected aircraft, etc. match to the flight parameters of a planned flight 1130 defined within dynamic airspace 1140 of the user. Accordingly, airspace controller 1110 may retrieve (at 3) flight parameters 1150 specified for flight 1130. For instance, flight parameters 1150 may specify ceiling height 1160, a flight duration, flight area 1170, and/or other restrictions associated with flight 1130. Airspace controller 1110 may also retrieve in-flight restrictions set by the user.

Airspace controller 1110 uses the established link to aircraft 1120 and/or other systems tracking aircraft 1120 to obtain real-time flight telemetry. Airspace controller 1110 may compare (at 4) the telemetry data to the flight parameters and/or the in-flight restrictions.

In response to the telemetry data deviating or exceeding from one or more flight parameters and/or in-flight restrictions, airspace controller 1110 may provide (at 5) an alert to the flight operator (e.g., a device used by the flight operator to control aircraft 1120 and/or other device carried by the flight operator), an alert to the user, and/or log the deviation in a flight report. For instance, in FIG. 11, an alert may be generated (at 5) in response to the airspace controller detecting that aircraft 1120 has flown outside an approved flight area 1160

In some embodiments, an alert may be generated when telemetry data is within a threshold amount of a parameter or restriction. For instance, airspace controller 1110 may generate a first alert when aircraft 1120 is within 5 feet (e.g., a first threshold) of a specified in-flight ceiling restriction (that is less than ceiling height 1160), a second alert when aircraft 1120 exceeds the specified in-flight ceiling restriction, a third alert when aircraft 1120 is within 10 feet (e.g., a second threshold) of ceiling height 1160, may generate a fourth alert when aircraft 1120 exceeds ceiling height 1160, and may generate a fifth alert when aircraft 1120 is back under ceiling height 1160. Similarly, airspace controller 1110 may generate alerts when aircraft 1120 flies beyond an authorized flight duration, when aircraft 1120 is some distance from the flight operator, and/or when restrictions of other flight parameters are violated.

The alerts provide warnings that the flight may be out of compliance, and thereby subject the user to fines and/or penalties. The alerts and/or flight reports may also notify the user as to flight operators that fly outside authorized flight areas.

In some embodiments, airspace controller 1110 may override user controls of aircraft 1120 to prevent flight outside of approved flight parameters. For instance, airspace controller 1110 may determine that aircraft 1120 has reached maximum allowed height 1160 that is permitted for the airspace within flight area 1170, and may disable further altitude increases of aircraft 1120 and/or commands from the flight operator controller to increase the altitude of aircraft 1120. Similarly, airspace controller 1110 may determine, based on the tracked telemetry data, that aircraft 1120 is at a boundary of flight area 1170, and may prevent aircraft 1120 from flying outside the boundary (e.g., disable and/or prevent commands from the flight operator controller that would take aircraft 1120 outside flight area 1170).

Airspace controller 1110 may generate different alerts based on different flight parameters, aircraft, flight operators, and/or applicable controlled airspace restrictions. For instance, the ceiling restrictions illustrated in FIG. 11 may be used to generate alerts for UAV flight, but would be different when tracking piloted aircraft, passenger flights, air taxis, etc. Accordingly, airspace controller 1110 may select a different set of alert thresholds for monitoring and/or alerting flights in different controlled airspace, involving different aircraft, involving different flight operators, and/or defined with different flight parameters.

Figure 12:
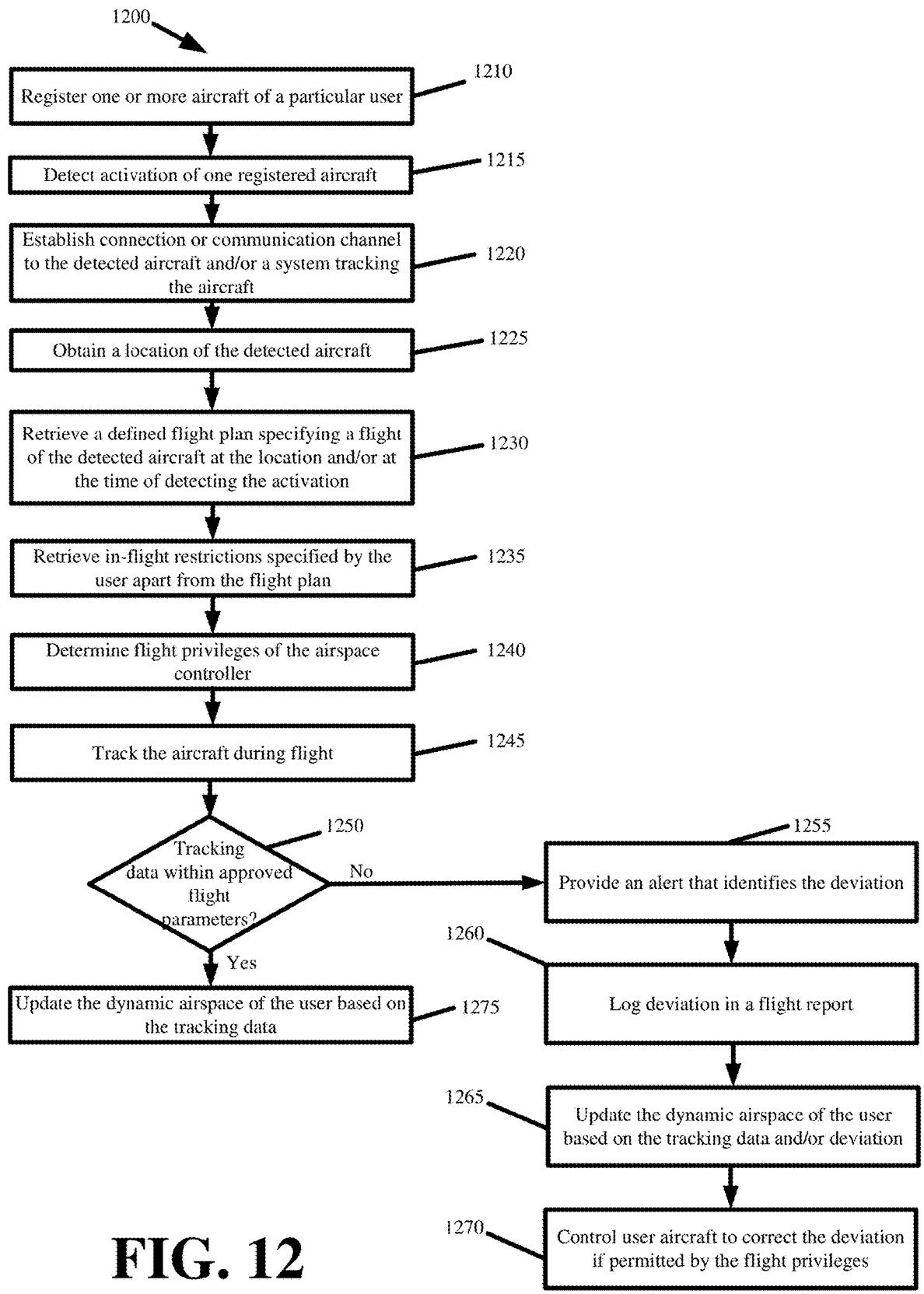
FIG. 12 presents a process by which the airspace controller may manage the dynamic airspace of different users in accordance with some embodiments presented herein.

FIG. 12 presents a process 1200 by which the airspace controller may manage the dynamic airspace of different users in accordance with some embodiments presented herein. Process 1200 may include registering (at 1210) one or more aircraft of a particular user. Registration (at 1210) may include the airspace controller obtaining identifying information of the user's aircraft. For instance, a serial number, Internet Protocol ("IP") address, and/or other unique identifier of the user's aircraft.

Process 1200 may include detecting (at 1215) activation of one of the registered aircraft. For instance, when a registered aircraft is powered on, a wireless radio of the registered aircraft may attempt to wirelessly connect to a nearby flight controller (e.g., remote control, UE, mobile device, etc.), and the flight controller may link the registered aircraft to the airspace controller. Alternatively, the registered aircraft may directly connect to the airspace controller upon being powered on. Alternatively, the airspace controller may detect (at 1215) activation of the user's aircraft based on information from external systems (e.g., ground-based radar, air traffic control systems, satellite tracking systems, and/or other equipment on the ground or in the air separate from the user's aircraft).

Process 1200 may include establishing (at 1220) a connection or communication channel to the detected aircraft and/or an external system that tracks the aircraft. The connection may enable communication between the airspace controller and the detected aircraft via a proxy (e.g., flight controller, user system interfacing with one or more of the user's aircraft, etc.), or via direct connectivity established between the airspace controller and the detected aircraft. The airspace controller may use the identifying information obtained for a registered aircraft to establish (at 1220) the connection or communication channel to that aircraft.

In response to detecting (at 1215) activation of the user aircraft and establishing a connection to the detected aircraft, process 1200 may include obtaining (at 1225) a location of the aircraft. Based on the obtained (at 1225) location, process 1200 may retrieve (at 1230) a defined flight plan, from the dynamic airspace of the user, that specifies a flight of the detected aircraft at the location and/or at the time of detecting (at 1215) the activation of the detected aircraft. As noted above, the flight plan may specify various applicable flight restrictions and/or flight parameters for the flight, and/or obtained approvals.

Process 1200 may also include retrieving (at 1235) in-flight restrictions specified by the user apart from the flight plan, and/or determining (at 1240) flight privileges of the airspace controller for this flight. The flight privileges may prevent the airspace controller from interfering with the flight, may allow the airspace controller to override various user controls of the aircraft to ensure compliance with the flight plan, or may provide the airspace controller with control of the aircraft during flight.

Process 1200 may include tracking (at 1245) the aircraft during flight. The airspace controller may track the aircraft based on a real-time feed of aircraft sensor output that is directly or indirectly communicated to airspace controller. As noted above, the sensor data may include altitude, direction, speed, location, battery level, and/or other data from onboard aircraft sensors. The airspace controller may also track the aircraft based on data that is collected from other sensors or systems that track the aircraft during flight. Process 1200 may include determining (at 1250) whether the tracking data is within approved flight parameters of the defined flight plan (e.g., does not deviate from the flight parameters or is within some threshold amount of the authorized flight parameters).

In response to determining (at 1250—No) that the tracking data deviates from the approved flight parameters of the flight plan, process 1200 may include providing (at 1255) an alert to the user and/or flight operator that identifies the deviation, logging (at 1260) the deviation in a flight report, updating (at 1265) the dynamic airspace of the user based on the tracking data and/or identified deviations, and controlling (at 1270) the user aircraft (e.g., overriding user control) to correct the deviation if the flight privileges permit the airspace controller to do so. The airspace controller may override user control of the aircraft in order to ensure that the flight remains within approved flight parameters.

In response to determining (at 1250—Yes) that the tracking data complies with approved flight parameters of the flight plan, process 1200 may include updating (at 1275) the dynamic airspace of the user based on the tracking data. In particular, the airspace controller may monitor the dynamic airspace of the user, aggregate tracking data from all active flights, and may update the presentation of each active flight in the user's dynamic airspace based on the aggregated tracking data. In doing so, the airspace controller may provide a holistic and comprehensive view of planned flights, and also active flights. The user can access the dynamic airspace via the GUI and/or API of the airspace controller, and may monitor multiple simultaneous flights that may be in different geographic regions to ensure that the flights are compliant and/or determine the status of each flight.

Figure 13:
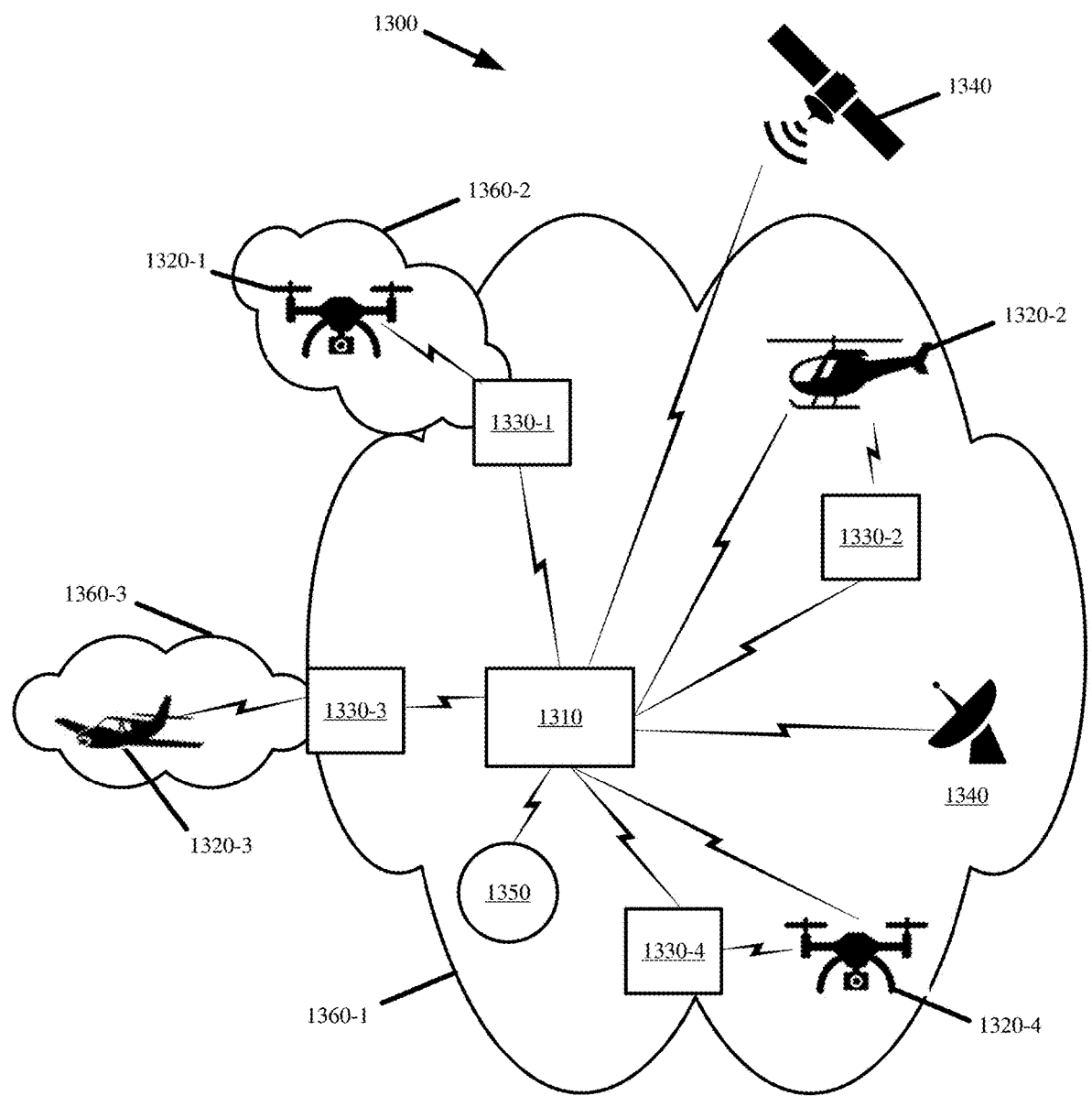
FIG. 13 illustrates example environment, in which systems and/or methods described herein may be implemented.

FIG. 13 illustrates example environment 1300, in which systems and/or methods described herein may be implemented. As shown in FIG. 13, environment 1300 may include airspace controller 1310, user aircraft 1320-1, 1320-2, 1320-3, and 1320-4 (herein sometimes collectively referred to as "user aircraft 1120" or individually as "user aircraft 1120"), UEs 1330-1, 1330-2, 1330-3, and 1330-4 (herein sometimes collectively referred to as "UEs 1330" or individually as "UE 1330"), external systems 1340, regulatory agencies 1350, and one or more wireless networks 1360-1, 1360-2, and 1360-3 (herein sometimes collectively referred to as "wireless networks 1360" or individually as "wireless network 1360").

The quantity of devices and/or networks, illustrated in FIG. 13, is provided for explanatory purposes only. In practice, environment 1300 may include additional devices and/or networks; fewer devices and/or networks; different devices and/or networks; or differently arranged devices and/or networks than illustrated in FIG. 13. For instance, some user aircraft 1320 may be piloted with a pilot in the aircraft, and may therefore not have a UE 1330 for remote operation of that aircraft. Devices of environment 1300 may interconnect with each other and/or other devices via wired connections, wireless connections, or a combination of wired and wireless connections. In some implementations, one or more devices of environment 1300 may be physically integrated in, and/or may be physically attached to, one or more other devices of environment 1300.

Airspace controller 1310 may be implemented and/or executed by dedicated and/or shared devices that are located within environment 1300. For instance, airspace controller 1310 may be a network-enabled server that creates and manages the dynamic airspace for different users as described above. Airspace controller 1310 may be a distributed device that wholly or partially executes on each UE 1330.

As shown in FIG. 13, airspace controller 1310 may directly connect to and/or communicate with user aircraft 1320-2 and user aircraft 1320-4 via wireless network 1360-1. The direct connection may allow airspace controller 1310 to obtain real-time flight information and/or sensor data directly from user aircraft 1320-2 and 1320-4. The direct connection may also allow airspace controller 1310 to control and/or override user controls of user aircraft 1320-2 and 1320-4 if airspace controller 1310 is granted flight privileges, by the user, to do so.

Airspace controller 1310 may indirectly connect to and communicate with user aircraft 1320-1 and 1320-3. For instance, user aircraft 1320-1 and 1320-3 may be outside the coverage area of wireless network 1360-1 or lack a wireless radio for communicating via wireless network 1360-1 (e.g., lack long-range or Wide Area Network ("WAN") connectivity). In some embodiments, user aircraft 1320-1 and 1320-3 may have the necessary hardware to communicate via wireless network 1360-1. However, for privacy or security reasons, user aircraft 1320-1 may only connect to and/or communicate with UE 1330-1, and user aircraft 1320-3 may only connect to and/or communicate with UE 1330-3. In any regard, airspace controller 1310 may indirectly obtain real-time flight information and/or sensory data for user aircraft 1320-1 and 1320-3 from UEs 1330-1 and 1330-3. Airspace controller 1310 may also control user aircraft 1320-1 and 1320-3 via instructions relayed from UEs 1330-1 and 1330-3 respectively. In some embodiments, UEs 1330 may install an application that provide airspace controller 1310 access to the flight information, sensor data, user aircraft flight controls, and/or other inputs to and outputs from user aircraft 1320.

Airspace controller 1310 may connect to and communicate with external systems 1340. External systems 1340 may be an alternative source by which airspace controller 1310 may track user aircraft 1320 during flight and/or obtain telemetry and/or other data for each flight.

Airspace controller 1310 may also connect to and communicate with regulatory agencies 1350. Airspace controller 1310 may obtain static controlled airspace maps (e.g., airspace restrictions) from regulatory agencies 1350, and may obtain approval for user-defined flights via regulatory agencies 1350.

User aircraft 1320 may include drones, UAVs, manned aircraft (e.g., piloted aircraft), passenger-carrying aircraft, cargo-carrying aircraft, jets, helicopters, zeppelins, blimps, ballooned aircraft, and/or other flying vehicles. User aircraft 1320 may include different makes and models of aircraft from different manufacturers. User aircraft 1320 may include one or more propellers, jet engines, and/or other means of flight. User aircraft 1320 may further include one or more sensors and one or more wireless radios. The sensors may be used to obtain telemetry data during flight. The sensors may track the aircraft's location, speed, direction, altitude, battery level, tilt, environmental conditions, and/or other flight data. The wireless radios may be used to receive flight commands from connected and/or paired UEs 1330 and/or airspace controller 1310, and may be also be used to convey the sensor data directly or indirectly to airspace controller 1310.

UEs 1330 may be devices with which flight operators control user aircraft 1330. UEs 1330 may include remote controls or other mobile devices (e.g., smartphones, tablet devices, laptop computers, etc.) that can wireless communicate with user aircraft 1320 and/or airspace controller 1310. In some embodiments, UEs 1330 may install and execute an application by which airspace controller 1310 may communicate (e.g., send and/or receive data) with each UE 1330 and/or indirectly communicate with and/or control user aircraft 1320.

User aircraft 1320 and UEs 1330 illustrated in FIG. 13 may be devices of the same user or two or more users. Airspace controller 1310 may simultaneously create and manage the dynamic airspace of different users regardless of the number of user aircraft 1320 operated by each user and/or the number of UEs 1330 that are in use.

External systems 1340 may include sensors, devices, and/or machines that can track user aircraft 1320 from the ground, air, or space, and that operate separate from user aircraft 1320. For instance, external systems 1340 may include ground-based radar, satellites, and air traffic control systems. External systems 1340 may be distributed across different geographic regions, and may track user aircraft 1320 operating in the airspace of those different geographic regions. External systems 1340 may track altitude, speed, trajectory, location, size, and/or other flight parameters. External systems 1340 may also track environmental conditions.

Regulatory agencies 1350 may include entities that define controlled airspace restrictions and/or that permit flight in controlled airspace. Regulatory agencies 1350 may include private, public, quasi-governmental, or governmental entities (e.g., the FAA).

The devices (e.g., airspace controller 1310, user aircraft 1320, UEs 1330, external systems 1340, and regulatory agencies 1350) communicate with one another via one or more wireless networks 1360. Wireless networks 1360 may include one or more WiFi networks, a Fourth Generation ("4G") network, an LTE network, a Fifth Generation Next Generation ("5G NR"), and/or other WAN. In some embodiments, wireless networks 1360 may correspond to different Radio Access Networks ("RANs") or service regions of a wireless telecommunications network. In some other embodiments, wireless networks 1360-2 and 1360-3 may correspond to different RANs or service regions, and network 1360-1 may correspond to a core network of the wireless telecommunications network.

In some embodiments, airspace controller 1310 may communicate with UE 1330-1 via a first network (e.g., wireless network 1360), and UE 1330-1 may communicate with user aircraft 1320-1 via a second network (e.g., wireless network 1360-2). For example, wireless network 1360-2 may be a private wireless network created and/or established between UE 1330-1 and user aircraft 1320-1. As another example, wireless network 1360-2 may be a WiFi network or short-range network. As yet another example, user aircraft 1320-1 may operate on the same wireless network (e.g., network 1360-1) as airspace controller, however user aircraft 1320-1 may establish an encrypted channel and/or connection with UE 1330-1 that allows only UE 1330-1 to directly communicate with user aircraft 1320-1. In any regard, UE 1330-1 may control user aircraft 1320-1 and may receive sensor data from user aircraft 1320-1 via wireless network 1360-2, and may provide the sensor data to airspace controller 1310 via wireless network 1360-1.

In some embodiments, airspace controller 1310 may directly communicate with user aircraft 1320-2 and 1320-4 when all devices operate on the same wireless network (e.g., network 1360-1) and airspace controller 1310 has sufficient privileges to communicate with and/or control user aircraft 1320-2 and 1320-4.

Figure 14:
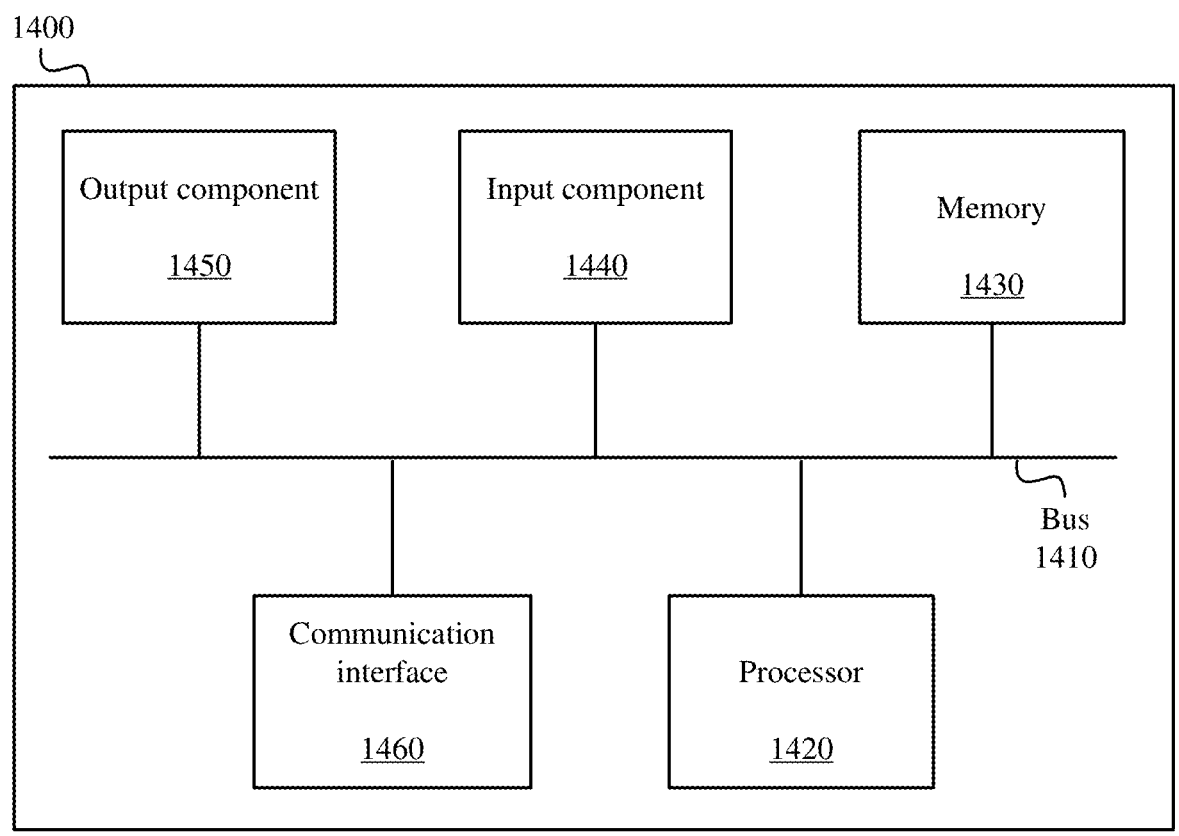
FIG. 14 illustrates example components of one or more devices, according to one or more embodiments described herein.

FIG. 14 is a diagram of example components of device 1400. Device 1400 may be used to implement airspace controller, user aircraft, and/or aircraft controllers. Device 1400 may include bus 1410, processor 1420, memory 1430, input component 1440, output component 1450, and communication interface 1460. In another implementation, device 1400 may include additional, fewer, different, or differently arranged components.

Bus 1410 may include one or more communication paths that permit communication among the components of device 1400. Processor 1420 may include a processor, microprocessor, or processing logic that may interpret and execute instructions. Memory 1430 may include any type of dynamic storage device that may store information and instructions for execution by processor 1420, and/or any type of non-volatile storage device that may store information for use by processor 1420.

Input component 1440 may include a mechanism that permits an operator to input information to device 1400, such as a keyboard, a keypad, a button, a switch, etc. Output component 1450 may include a mechanism that outputs information to the operator, such as a display, a speaker, one or more light emitting diodes ("LEDs"), etc.

Communication interface 1460 may include any transceiver-like mechanism that enables device 1400 to communicate with other devices and/or systems. For example, communication interface 1460 may include an Ethernet interface, an optical interface, a coaxial interface, or the like. Communication interface 1460 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1400 may include more than one communication interface 1460. For instance, device 1400 may include an optical interface and an Ethernet interface.

Device 1400 may perform certain operations relating to one or more processes described above. Device 1400 may perform these operations in response to processor 1420 executing software instructions stored in a computer-readable medium, such as memory 1430. A computer-readable medium may be defined as a non-transitory memory device. A memory device may include space within a single physical memory device or spread across multiple physical memory devices. The software instructions may be read into memory 1430 from another computer-readable medium or from another device. The software instructions stored in memory 1430 may cause processor 1420 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A device comprising:
a non-transitory computer-readable medium storing a set of processor-executable instructions; and
one or more processors configured to execute the set of processor-executable instructions, wherein executing the set of processor-executable instructions causes the one or more processors to:
present a graphical user interface ("GUI") with which to define a flight plan;
receive selection of a particular aircraft from a plurality of different aircraft or aircraft types for the flight plan via user interactions with the GUI;
modify the GUI to present a plurality of different airspace user interface ("UI") elements at different regions of controlled airspace, each airspace UI element of the plurality of airspace UI elements representing one or more different airspace restrictions for the particular aircraft at a region of controlled airspace covered by that airspace UI element;
define the flight plan to include a particular region of controlled airspace for a flight and one or more parameters of the flight based on user interactions with the GUI;
select a set of regulations from different sets of regulations, that are defined by one or more regulatory agencies, based on one or more of the particular region of controlled airspace, the particular aircraft, and the one or more parameters;
provide, within the GUI at a first time, approval of the flight in response to the flight plan complying with the set of regulations;
determine a particular approval procedure of the one or more regulatory agencies to approve the flight with at least one noncompliant parameter in response to the flight plan being rejected for not complying with the set of regulations as a result of the one or more parameters of the flight violating one or more regulations of the set of regulations for the particular aircraft in the particular region;
submit an approval request of the flight plan with the at least one noncompliant parameter from the device to the one or more regulatory agencies according to the particular approval procedure in response to the flight plan being rejected; and
provide, within the GUI at a second time after the first time, approval of the flight with at least one exception to the at least one noncompliant parameter that is authorized by the one or more regulatory agencies in response to completing the particular approval procedure.

2. The device of claim 1, wherein the processor-executable instructions further include processor-executable instructions to:
determine a first approval permitting the flight to occur with a first parameter of the one or more parameters in violation of a first regulation from the one or more regulations;
determine a different second approval permitting the flight to occur with a second parameter of the one or more parameters in violation of a second regulation from the one or more regulations; and complete the particular approval procedure in response to obtaining the first approval and the second approval.

3. The device of claim 2, wherein the processor-executable instructions further include processor-executable instructions to:

update the flight plan with the first approval and the second approval in response to obtaining the first approval and the second approval.

4. The device of claim 2, wherein the processor-executable instructions further include processor-executable instructions to:

issue a first request for the first approval to a first regulatory agency; and issue a second request for the second approval to a different second regulatory agency.

5. The device of claim 2, wherein the processor-executable instructions further include processor-executable instructions to:

obtain the first approval in response to a first request that is directed to a first certificate, authorization, exception, or exemption for a first regulation from the one or more regulations; and obtain the second approval in response to a second request that is directed to a different second certificate, authorization, exception, or exemption for a second regulation from the one or more regulations.

6. The device of claim 1, wherein the processor-executable instructions further include processor-executable instructions to:

receive, from a user within the second time, one or more of an uploaded certificate, authorization, exemption, or exception to the one or more regulations; and change status of the approval in response to receiving the one or more uploaded certificate, authorization, exemption, or exception.

7. The device of claim 1, wherein the processor-executable instructions further include processor-executable instructions to:

define user airspace that is customized based on the flight plan;

produce a first modified user airspace in response to the approval of the flight at the first time as a result of the flight plan complying with the set of regulations; and produce a different second modified user airspace in response to the approval of the flight at the second time as a result of completing the particular approval procedure, wherein the second modified user airspace identifies one or more of a certificate, authorization, exception, or exemption to the one or more regulations.

8. The device of claim 1, wherein the processor-executable instructions further include processor-executable instructions to:

determine that the flight plan complies with the set of regulations;

submit a request for Low Altitude Authorization and Notification Capability ("LAANC") authorization in response to determining that the flight plan complies with the set of regulations; and receive the approval within the first time as a result of submitting the request for the LAANC authorization.

9. The device of claim 1, wherein the particular approval procedure comprises one of a first procedure for obtaining LAANC authorization, a second procedure for obtaining a waiver to exceed limitations of the one or more regulations, and a third procedure for obtaining an exemption to the one or more regulations.

10. The device of claim 1, wherein the processor-executable instructions further include processor-executable instructions to:

identify one or more of the particular region, particular aircraft, or one or more parameters of the flight that violates the one or more regulations; and provide one or more remedial actions to cure violation of the one or more regulations.

11. The device of claim 1, wherein the processor-executable instructions further include processor-executable instructions to:

identify one or more of the particular region, particular aircraft, or one or more parameters of the flight that violates the one or more regulations; and provide one or more UI elements in the GUI with which to adjust the flight plan.

12. The device of claim 1, wherein the processor-executable instructions further include processor-executable instructions to:

detect activation of the particular aircraft in the particular region of controlled airspace;

clear the particular aircraft for flight in response to providing the approval and the activation satisfying the flight plan.

13. The device of claim 12, wherein the processor-executable instructions further include processor-executable instructions to:

restrict flight of the particular aircraft in response to the activation occurring outside the flight plan or prior to providing the approval.

14. The device of claim 12, wherein the processor-executable instructions further include processor-executable instructions to:

issue one or more alerts to a user in response to the activation occurring outside the flight plan or prior to providing the approval.

15. The device of claim 1, wherein the processor-executable instructions further include processor-executable instructions to:

track flight of the particular aircraft in the particular region using one or more sensors of the particular aircraft or sensors monitoring flight of the particular aircraft;

issue one or more alerts to a user in response to tracking deviation of the flight from the one or more parameters of the flight plan.

16. The device of claim 1, wherein the processor-executable instructions further include processor-executable instructions to:

monitor flight of the particular aircraft in the particular region; and report compliance of the flight relative to the one or more parameters of the flight plan.

17. A non-transitory computer-readable medium, storing a set of processor-executable instructions, which, when executed by one or more processors, cause the one or more processors to:

present a graphical user interface ("GUI") with which to define a flight plan;

receive selection of a particular aircraft from a plurality of different aircraft or aircraft types for the flight plan via user interactions with the GUI;

modify the GUI to present a plurality of different airspace user interface ("UI") elements at different regions of controlled airspace, each airspace UI element of the plurality of airspace UI elements representing one or more different airspace restrictions for the particular aircraft at a region of controlled airspace covered by that airspace UI element define the flight plan to include a particular region of controlled airspace for a flight and one or more parameters of the flight based on user interactions with the GUI;

select a set of regulations from different sets of regulations, that are defined by one or more regulatory agencies, based on one or more of the particular region of controlled airspace, the particular aircraft, and the one or more parameters;

provide, within the GUI at a first time, approval of the flight in response to the flight plan complying with the set of regulations;

determine a particular approval procedure of the one or more regulatory agencies to approve the flight with at least one noncompliant parameter in response to the flight plan being rejected for not complying with the set of regulations as a result of the one or more parameters of the flight violating one or more regulations of the set of regulations for the particular aircraft in the particular region;

submit an approval request of the flight plan with the at least one noncompliant parameter to the one or more regulatory agencies according to the particular approval procedure in response to the flight plan being rejected; and provide, within the GUI at a second time after the first time, approval of the flight with at least one exception to the at least one noncompliant parameter that is authorized by the one or more regulatory agencies in response to completing the particular approval procedure.

18. The non-transitory computer-readable medium of claim 17, wherein the processor-executable instructions further include processor-executable instructions to:

determine a first approval permitting the flight to occur with a first parameter of the one or more parameters in violation of a first regulation from the one or more regulations;

determine a different second approval permitting the flight to occur with a second parameter of the one or more parameters in violation of a second regulation from the one or more regulations; and complete the particular approval procedure in response to obtaining the first approval and the second approval.

19. The non-transitory computer-readable medium of claim 18, wherein the processor-executable instructions further include processor-executable instructions to:

obtain the first approval in response to a first request that is directed to a first certificate, authorization, exception, or exemption for a first regulation from the one or more regulations; and obtain the second approval in response to a second request that is directed to a different second certificate, authorization, exception, or exemption for a second regulation from the one or more regulations.

20. A method comprising:

presenting a graphical user interface ("GUI") with which to define a flight plan;

receiving selection of a particular aircraft from a plurality of different aircraft or aircraft types for the flight plan via user interactions with the GUI;

modifying the GUI to present a plurality of different airspace user interface ("UI") elements at different regions of controlled airspace, each airspace UI element of the plurality of airspace UI elements representing one or more different airspace restrictions for the particular aircraft at a region of controlled airspace covered by that airspace UI element;

defining the flight plan to include a particular region of controlled airspace for a flight and one or more parameters of the flight based on user interactions with the GUI;

selecting a set of regulations from different sets of regulations, that are defined by one or more regulatory agencies, based on one or more of the particular region of controlled airspace, the particular aircraft, and the one or more parameters;

providing, within the GUI at a first time, approval of the flight in response to the flight plan complying with the set of regulations;

determining a particular approval procedure of the one or more regulatory agencies to approve the flight with at least one noncompliant parameter in response to the flight plan being rejected for not complying with the set of regulations as a result of the one or more parameters of the flight violating one or more regulations of the set of regulations for the particular aircraft in the particular region;

submitting an approval request of the flight plan with the at least one noncompliant parameter to the one or more regulatory agencies according to the particular approval procedure in response to the flight plan being rejected; and providing, within the GUI at a second time after the first time, approval of the flight with at least one exception to the at least one noncompliant parameter that is authorized by the one or more regulatory agencies in response to completing the particular approval procedure.

* * * * *